United States Patent
Park et al.

(10) Patent No.: US 10,509,125 B2
(45) Date of Patent: Dec. 17, 2019

(54) METHOD AND DEVICE FOR ACQUIRING DISTANCE INFORMATION

(71) Applicant: SAMSUNG ELECTRONICS CO., LTD., Suwon-si (KR)

(72) Inventors: Yonghwa Park, Yongin-si (KR); Heesun Yoon, Seoul (KR); Jisan Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 632 days.

(21) Appl. No.: 15/209,123

(22) Filed: Jul. 13, 2016

(65) Prior Publication Data

US 2017/0184722 A1    Jun. 29, 2017

(30) Foreign Application Priority Data

Dec. 24, 2015  (KR) .................. 10-2015-0186778

(51) Int. Cl.
   *G01C 3/08*   (2006.01)
   *G01S 17/32*  (2006.01)
   *G01S 17/89*  (2006.01)

(52) U.S. Cl.
   CPC ............ *G01S 17/32* (2013.01); *G01S 7/4915* (2013.01); *G01S 17/89* (2013.01)

(58) Field of Classification Search
   CPC ......... G01S 7/4915; G01S 17/32; G01S 17/89
   USPC ....................................................... 356/4.01
   See application file for complete search history.

(56) References Cited

U.S. PATENT DOCUMENTS

| | | |
|---|---|---|
| 4,935,616 A | 6/1990 | Scott |
| 5,081,530 A | 1/1992 | Medina |
| 6,057,909 A | 5/2000 | Yahav et al. |
| 6,088,086 A | 7/2000 | Muguira et al. |
| 6,100,517 A | 8/2000 | Yahav et al. |
| 6,118,946 A | 9/2000 | Ray et al. |
| 6,331,911 B1 | 12/2001 | Manassen et al. |
| 6,794,628 B2 | 7/2004 | Yahav et al. |
| 6,856,355 B1 | 2/2005 | Ray et al. |
| 7,095,487 B2 | 8/2006 | Gonzalez-Banos et al. |
| 7,230,685 B2 | 6/2007 | Suzuki et al. |
| 8,432,599 B2 | 4/2013 | Cho et al. |
| 8,492,863 B2 | 7/2013 | Cho et al. |
| 8,611,610 B2 | 12/2013 | Park et al. |
| 8,902,411 B2 | 12/2014 | Park et al. |
| 9,151,711 B2 | 10/2015 | Cho et al. |

(Continued)

FOREIGN PATENT DOCUMENTS

| | | |
|---|---|---|
| JP | 2009-065605 A | 3/2009 |
| KR | 10-2010-0075366 A | 7/2010 |

(Continued)

*Primary Examiner* — Mark Hellner
(74) *Attorney, Agent, or Firm* — Sughrue Mion, PLLC

(57) ABSTRACT

A method of acquiring distance information is provided. The method includes determining a projecting order of different projected lights to be sequentially projected onto an object, based on a position of the object and/or an external input, sequentially projecting the different projected lights onto the object in the determined projecting order, obtaining modulated reflected lights by modulating the reflected lights reflected by the object; and acquiring information about a distance between the device and the object based on the modulated reflected lights.

22 Claims, 16 Drawing Sheets

(56) References Cited

U.S. PATENT DOCUMENTS

| | | | |
|---|---|---|---|
| 9,709,669 B2* | 7/2017 | Kim | G01S 17/36 |
| 2006/0241371 A1 | 10/2006 | Rafii et al. | |
| 2010/0163889 A1 | 7/2010 | Park et al. | |
| 2010/0177372 A1 | 7/2010 | Park et al. | |
| 2010/0182671 A1 | 7/2010 | Park | |
| 2010/0321755 A1 | 12/2010 | Cho et al. | |
| 2010/0328750 A1 | 12/2010 | Kim et al. | |
| 2011/0074659 A1 | 3/2011 | Park et al. | |
| 2011/0164132 A1* | 7/2011 | Buettgen | G01S 17/36 348/135 |
| 2011/0170160 A1 | 7/2011 | Park et al. | |
| 2012/0069176 A1 | 3/2012 | Park et al. | |
| 2012/0300038 A1 | 11/2012 | You et al. | |
| 2013/0176445 A1 | 7/2013 | Streeter et al. | |
| 2014/0300701 A1* | 10/2014 | Park | G01S 17/36 348/46 |
| 2015/0153628 A1 | 6/2015 | Cho et al. | |
| 2015/0260830 A1* | 9/2015 | Ghosh | G01S 7/484 250/208.1 |
| 2016/0065942 A1 | 3/2016 | Park | |
| 2016/0170237 A1 | 6/2016 | Han et al. | |

FOREIGN PATENT DOCUMENTS

| | | | |
|---|---|---|---|
| KR | 10-2010-0080092 A | 7/2010 |
| KR | 10-2010-0084018 A | 7/2010 |
| KR | 10-2010-0084842 A | 7/2010 |
| KR | 10-2010-0130782 A | 12/2010 |
| KR | 10-2010-0135548 A | 12/2010 |
| KR | 10-2010-0138147 A | 12/2010 |
| KR | 10-2011-0081649 A | 7/2011 |
| KR | 10-2011-0085785 A | 7/2011 |
| KR | 10-2011-0086364 A | 7/2011 |
| KR | 10-2012-0030196 A | 3/2012 |
| KR | 10-2012-0061379 A | 6/2012 |
| KR | 10-2012-0069406 A | 6/2012 |
| KR | 10-2012-0071970 A | 7/2012 |
| KR | 10-2012-0075182 A | 7/2012 |
| KR | 10-2012-0077417 A | 7/2012 |
| KR | 10-2012-0130937 A | 12/2012 |
| KR | 10-2014-0121710 A | 10/2014 |
| KR | 10-2016-0026189 A | 3/2016 |

* cited by examiner

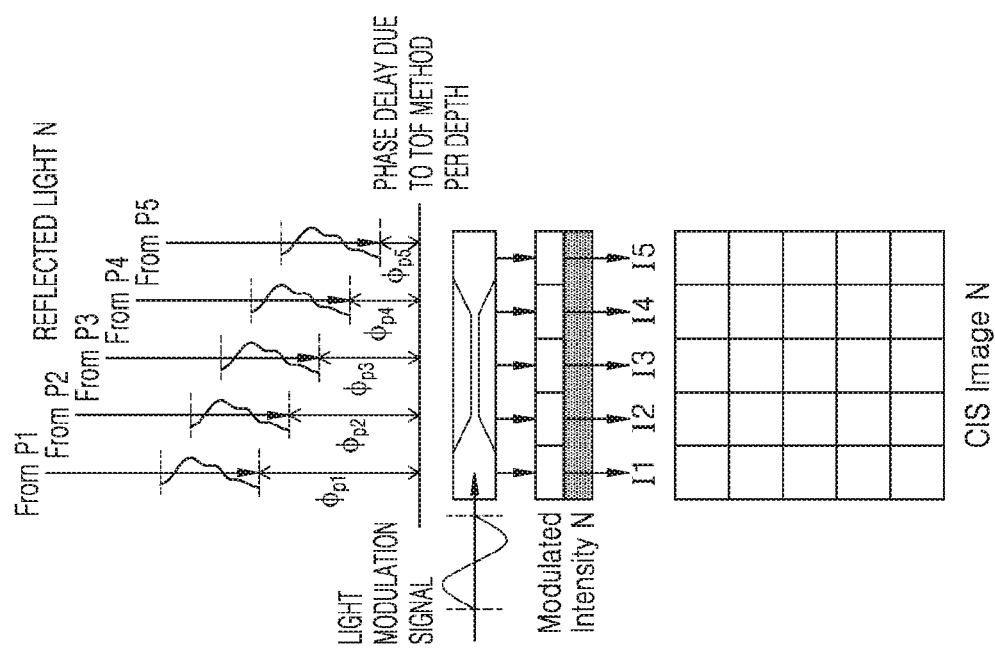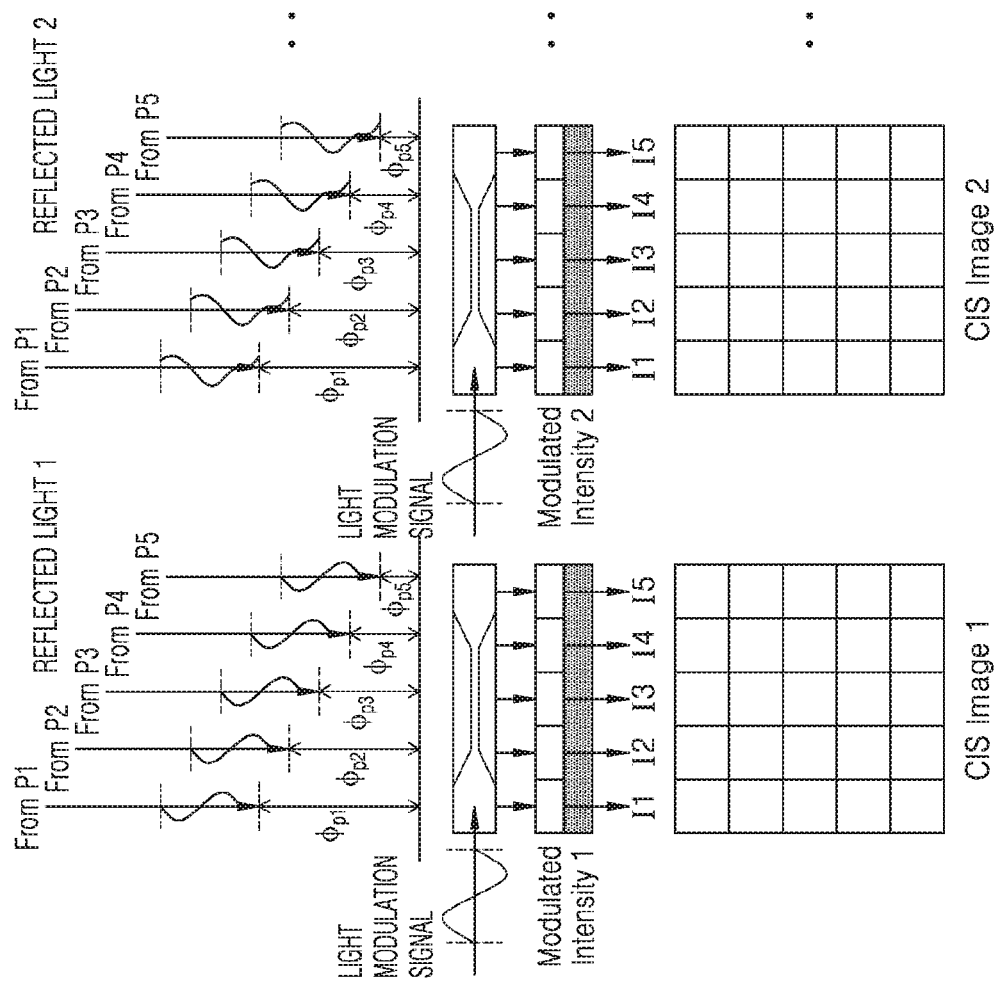

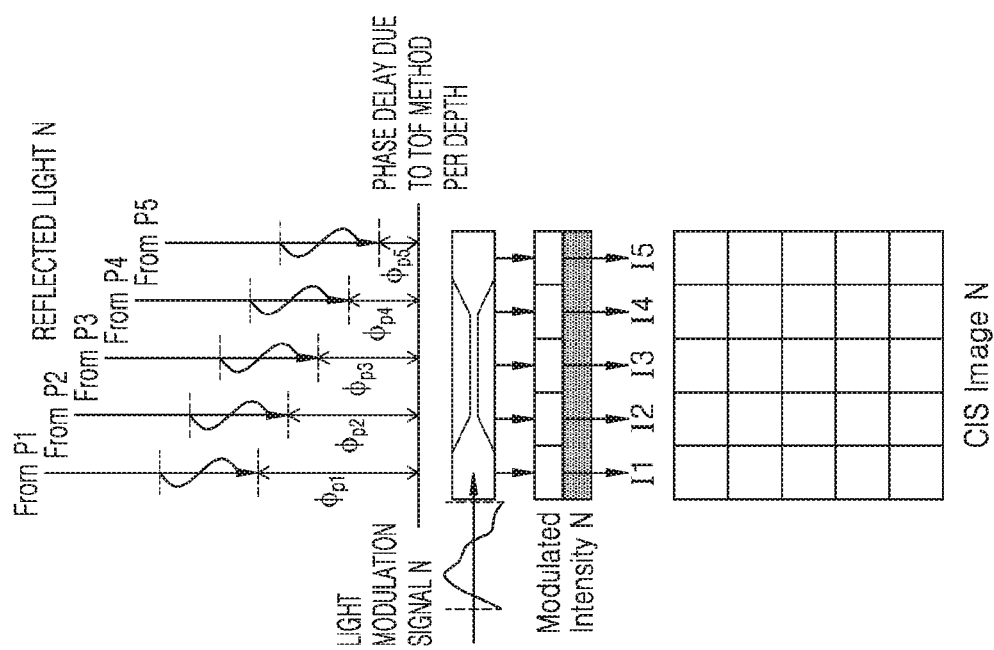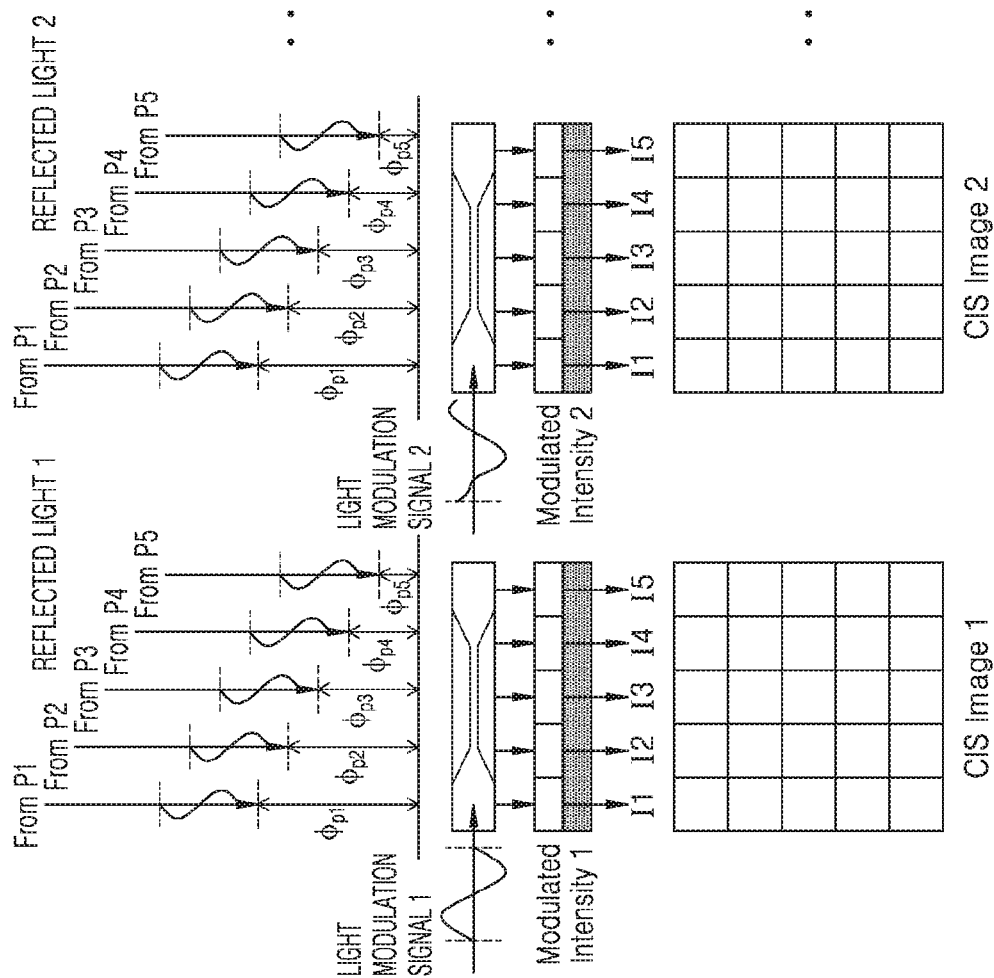

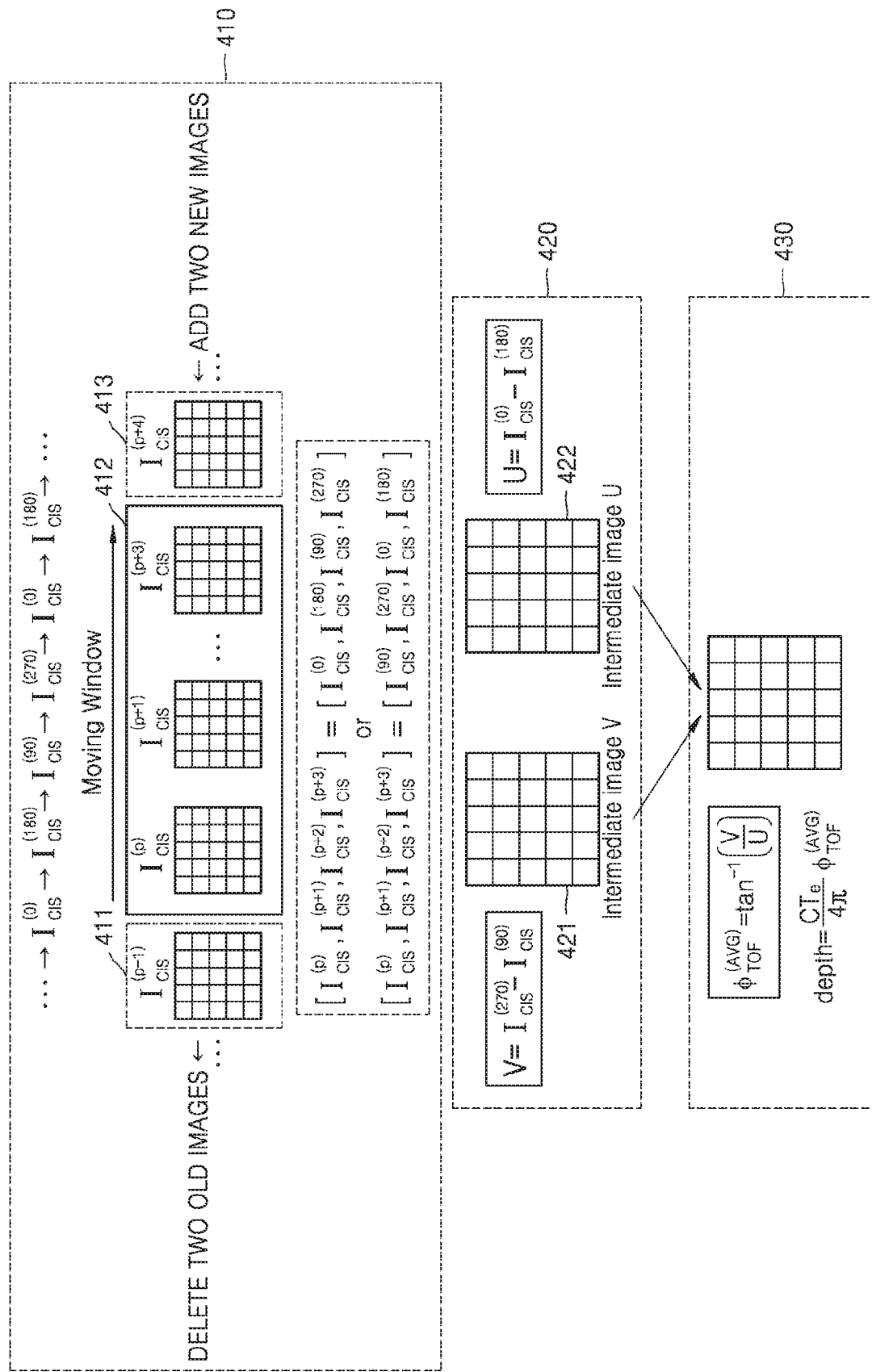

METHOD AND DEVICE FOR ACQUIRING DISTANCE INFORMATION

CROSS-REFERENCE TO RELATED APPLICATION

This application claims from Korean Patent Application No. 10-2015-0186778, filed on Dec. 24, 2015, in the Korean Intellectual Property Office, the disclosure of which is incorporated by reference herein in its entirety.

BACKGROUND

1. Field

The present disclosure relates to methods and devices for acquiring distance information, and more particularly, to methods and devices for acquiring a three-dimensional image.

2. Description of the Related Art

Recently, the importance of three-dimensional (3D) content has emerged with the development and increased demand for 3D display devices capable of displaying images having a sense of depth. Therefore, 3D image acquiring devices such as 3D cameras that may be used by general users to directly create 3D content have been studied. Such 3D cameras acquire depth information in addition to general two-dimensional color image information in one photographing operation.

Depth information about a distance between surfaces of objects and a 3D camera may be acquired by using a stereo vision method using two cameras or a triangulation method using structured light and a camera. However, in the stereo vision method and the triangulation method, the accuracy of depth information decreases drastically as a distance between an object and an optical device increases and it is difficult to acquire precise depth information because both methods are dependent on the state of a surface of the object.

In order to address these disadvantages of the stereo vision method and the triangulation method, a time-of-flight (TOF) method has been suggested. In the TOF method, a laser beam is emitted toward an object and a time taken by light reflected by the object to reach a receiver is measured. The TOF method may be performed in various ways according to a series of light processes.

SUMMARY

It is an aspect to provide a method of acquiring distance information, whereby an error is efficiently reduced by controlling lights projected onto an object, when a device acquires information about a distance between the device and the object.

Additional aspects will be set forth in part in the description which follows and, in part, will be apparent from the description, or may be learned by practice of the presented exemplary embodiments.

According to an aspect of an exemplary embodiment, there is provided A method of acquiring distance information, the method being performed by a device, the method comprisingdetermining a projecting order of N (where N is a natural number equal to or greater than 3) different projected lights to be sequentially projected onto an object, based on a position of the object and/or an external input; sequentially projecting the N different projected lights onto the object in the determined projecting order; obtaining N modulated reflected lights by modulating N reflected lights reflected by the object; and acquiring information about a distance between the device and the object based on the N modulated reflected lights.

The determining of the projecting order may comprise acquiring initial distance information about a distance between the object and the device, and determining the projecting order based on the acquired initial distance information.

The acquiring of the initial distance information may be performed in real time.

The determining of the projecting order may comprise acquiring initial distance information about a distance between the object and the device, and determining the projecting order to minimize a motion blur of the object based on the acquired initial distance information.

The determining of the projecting order may comprise determining the projecting order of projected lights to minimize motion blur of the object from among a plurality of preset projecting orders of projected lights as the projecting order of projected lights.

The N different projected lights may comprise periodic waves having an identical period and at least one of different sizes and different phases.

The obtaining of the N modulated reflected lights may comprise obtaining the N modulated reflected lights by modulating the N reflected lights based on a light modulation signal having a gain waveform.

The light modulation signal may comprise periodic waves having a same period as the projected lights.

A phase difference resulting from dividing 360° by N may exist between the N projected lights having respective phases.

The determining of the projecting order may comprise determining the projecting order of projected lights based on an external input that is determined based on a user input.

According to another aspect of an exemplary embodiment, there is provided a device for acquiring information about an object, the device comprising a projected light controller configured to determine a projecting order of N (where N is a natural number equal to or greater than 3) different projected lights to be sequentially projected onto an object, based on a position of the object and/or an external input; a light source configured to sequentially project the object with the N different projected lights in the determined projecting order; a modulator configured to obtain N modulated reflected lights by modulating N reflected lights reflected by the object; and a controller configured to acquire information about a distance between the device and the object based on the N modulated reflected lights.

The projected light controller may be configured to acquire initial distance information about a distance between the object and the device, and to determine the projecting order of projected lights based on the acquired initial distance information.

The projected light controller may be configured to acquire the initial distance information in real time.

The projected light controller may be configured to acquire initial distance information about the distance between the object and the device, and to determine the projecting order to minimize motion blur of the object based on the acquired initial distance information.

The projected light controller may be configured to determine the projecting order to minimize motion blur of the object from among a plurality of preset projecting orders of projected lights as the projecting order of projected lights.

The N different projected lights may comprise periodic waves having an identical period and at least one of different sizes and different phases.

The modulator may be configured to obtain the N modulated reflected lights by modulating the N reflected lights based on a light modulation signal having a gain waveform.

The light modulation signal may comprise periodic waves having a same period as the projected lights.

A phase difference resulting from dividing 360° by N may exist between the N projected lights having respective phases.

According to another aspect of an exemplary embodiment, there is provided a non-transitory computer-readable recording medium having recorded thereon a program for executing the method.

According to another aspect of an exemplary embodiment, there is provided a method of acquiring distance information, the method being performed by a device, the method comprising iteratively performing sequentially projecting N different projected lights onto an object in a projecting order; obtaining N modulated reflected lights by modulating N reflected lights reflected by the object; acquiring distance information about a distance between the device and the object based on the N modulated reflected lights; changing the projecting order of the N different projected lights based on the acquired distance information; and sequentially projecting the N different projected lights onto the object in the changed projecting order.

An initial projecting order may be set based on an external input.

N may be 4, and an initial projecting order may be projected lights with phases of 0, 90, 180 and 270 in order.

An initial projecting order may be set based on an initially determined distance from the device to the object.

BRIEF DESCRIPTION OF THE DRAWINGS

The above and/or other aspects will become apparent and more readily appreciated from the following description of the exemplary embodiments, taken in conjunction with the accompanying drawings in which:

FIGS. 2A-2C illustrate that N different images are generated in an imaging device after N different reflected lights are modulated, according to an exemplary embodiment;

FIGS. 3A-3C illustrate that N different images are generated by using an identical projected light and N different gain waveforms, according to an exemplary embodiment;

FIG. 4 illustrates a method of generating four different images by using four projected lights having different phases and acquiring distance information by using the generated four different images, according to an exemplary embodiment;

DETAILED DESCRIPTION

Figure 1:
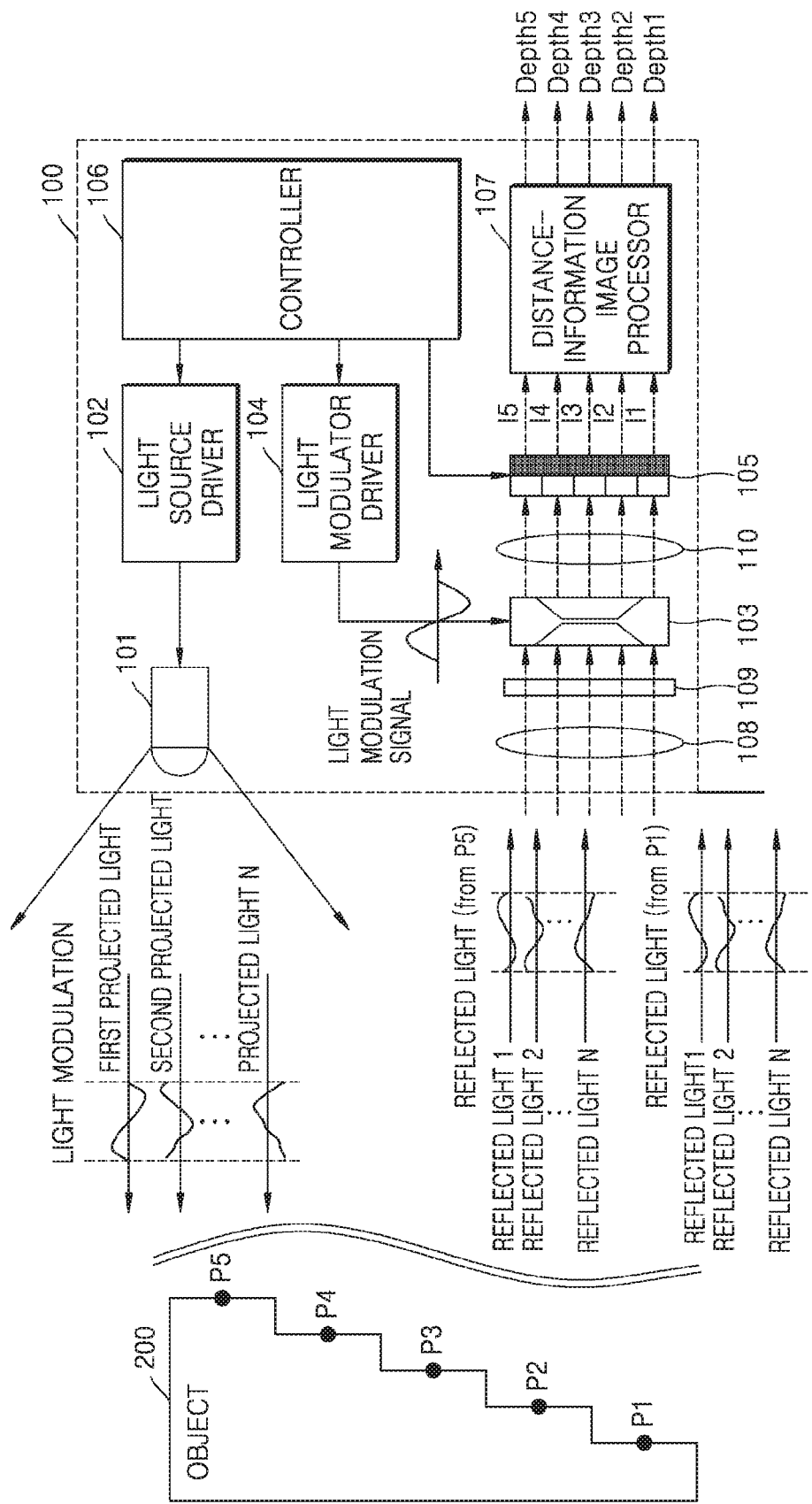
FIG. 1 is a schematic view illustrating an exemplary structure of a device for acquiring distance information by using a time-of-flight (TOF) method, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Terms used in the present specification will be briefly described, and the disclosure will be described in detail.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the exemplary embodiments. Accordingly, it will be understood that the terms used herein should be interpreted as having a meaning that is consistent with their meaning in the context of the relevant art and will not be interpreted in an idealized or overly formal sense unless expressly so defined herein.

Throughout the specification, when a portion "includes" an element, another element may be further included, rather than excluding the existence of the other element, unless otherwise described. In addition, a term "unit" used in the specification indicates a software or hardware component such as field-programmable logic array (FPLA) and application-specific integrated circuit (ASIC), and the "unit" performs a particular function. However, the "unit" is not limited to software or hardware. The "unit" may be configured to be stored in an addressable storing medium or to play back one or more processors. Accordingly, the "unit" may include, for example, software components, object-oriented software components, components such as class components and task components, processors, formulas, attributes, procedures, subroutines, segments of program codes, drivers, firmware, micro codes, circuits, data, database, data structures, tables, arrays and variables. Functions provided in components and "units" may be combined into a smaller number of components and "units", or may be further divided into additional components and "units".

Throughout the specification, it will be understood that when a unit is referred to as being "connected" to another element, it may be "directly connected" to the other element or "electrically connected" to the other element in a state in which intervening elements are present. In addition, it will be understood that when a unit is referred to as "comprising" another element, it may not exclude the other element but may further include the other element unless specifically oppositely indicates.

Throughout the specification, a "distance" may denote a length which is spatially separated from an object, and a "depth" may be a kind of a distance. For example, distance information may include depth information.

Throughout the specification, an image may include a Charge Coupled Device (CCD) image and a Contact Image Sensors or CMOS Image Sensors (CIS) image but is not limited thereto.

Hereinafter, an 'image' may denote a still image or an image of a video or a moving image, that is, the entire video.

Hereinafter, a method and a device for acquiring distance information will be described in detail with reference to the accompanying drawings. Like reference numerals refer to like elements throughout. In the drawings, the sizes of constituent elements may be exaggerated for clarity.

In general, a time-of-flight (TOF) method for acquiring distance involves projecting lights having a specific wavelength, for example, light having a near infrared (NIR) wavelength of 850 nm, onto an object by using an illumination optical system including a light-emitting diode (LED) or a laser diode (LD), receiving the light having the wavelength of 850 nm reflected by the object to a receiver, and modulating the received light by using a modulator having a known gain waveform to acquire depth information.

FIG. 1 is a schematic view illustrating an exemplary structure of a device 100 for acquiring distance information by using a time-of-flight (TOF) method, according to an exemplary embodiment. Referring to FIG. 1, the device 100 may include a light source 101 for generating light having a wavelength, a light source driver 102 for driving the light source 101, a light modulator 103 for modulating reflected lights reflected by an object 200, a light modulator driver 104 for driving the light modulator 103, an imaging device 105 for generating an image according to the light modulated by the light modulator 103, a distance-information image processor 107 for calculating distance information based on an output of the imaging device 105, and a controller 106 for controlling operations of the light source driver 102, the light modulator driver 104, and the imaging device 105, and the distance-information image processor 107. A first lens 108 for focusing the reflected lights within an area of the light modulator 103 and a filter 109 for filtering only light having a specific wavelength may be disposed near a light incident surface of the light modulator 103. A second lens 110 for focusing the modulated image within an area of the imaging device 105 may be disposed between the light modulator 103 and the imaging device 105.

For example, the light source 101 may be a light-emitting diode (LED) or a laser diode (LD) for emitting light having a near infrared (NIR) wavelength of about 800 nm to about 1100 nm which is not visible to the human eye for eye safety. However, the present exemplary embodiment is not limited to specific wavelength bands or specific types of light sources. For example, the light source driver 102 may drive the light source 101 by using an amplitude modulation method or a phase modulation method according to a control signal received from the controller 106. According to a drive signal of the light source driver 102, projected lights projected to the object 200 from the light source 101 may be expressed as a periodic continuous function having a period. For example, the projected lights may have a defined waveform, such as a sinusoidal waveform, a ramp waveform, or a rectangular waveform, or a general waveform that is not defined.

The light modulator 103 modulates the light reflected by the object 200 under control of the light modulator driver 104. The light modulator driver 104 drives the light modulator 103 according to a control signal received from the controller 106. For example, the light modulator 103 may vary a gain according to a light modulation signal having a waveform provided by the light modulated driver 104 and may modulate an intensity of the reflected light. To this end, the light modulator 103 may have a variable gain. The light modulator 103 may operate at a high light modulation rate of tens to hundreds of MHz in order to determine a phase difference of light according to a distance and a light travelling time. Examples of the light modulator 103 may include an image intensifier including a multi-channel plate (MCP), a GaAs-based solid-state modulation device, and a thin film modulation device using an electro-optic material. Although the light modulator 103 in FIG. 1 is of a transmission type, the present embodiment is not limited thereto and a reflective light modulator may be used.

The imaging device 105 detects the modulated image obtained by the light modulator 103 under control of the controller 106 and generates an image. If only a distance between the device 100 and one point of the object 200 is to be measured, the imaging device 105 may use, for example, one light sensor such as a photodiode or an integrator. However, if distances between the device 100 and a plurality of points of the object 200 are to be measured, the imaging device 105 may use a two-dimensional (2D) or one-dimensional (1D) array of photodiodes or other photodetectors. For example, the imaging device 105 may be a charge-coupled diode (CCD) image sensor or a complementary metal-oxide semiconductor (CMOS) image sensor including a 2D array. The distance-information image processor 107 calculates distance information according to a distance information obtaining algorithm based on the output of the imaging device 105. The distance information obtaining algorithm may be preset. The distance-information image processor 107 may be an exclusive integrated circuit (IC) or software provided in the device 100. In the case of software, the distance-information image processor 107 may be stored in a separate portable storage medium.

The operation of the device 100 constructed as described above will now be explained briefly.

The light source 101 may sequentially project N different projected lights each having a prescribed period and a prescribed waveform onto the object 200 under control of the controller 106 and the light source driver 102. N may be a natural number equal to or greater than 3. For example, if four different projected lights are used, the light source 101 may generate and project a first projected light onto the object 200 for a time T1, a second projected light onto the object 200 for a time T2, a third projected light onto the object 200 for a time T3, and a fourth projected light onto the object 200 for a time T4. The projected lights sequentially projected onto the object 200 may be expressed as a continuous function having a period such as a sinusoidal waveform. For example, the first to fourth projected lights may have the same period and waveform and different sizes and phases. As another example, the first to fourth projected lights may have the same period, waveform, and size and different phases. For example, the first to fourth projected lights may have phase differences of 90° sequentially and respectively. In this case, a phase of the first projected light may be delayed by 90° from that of the second projected light, a phase of the second projected light may be delayed by 90° from that of the third projected light, and a phase of the third projected light may be delayed by 90° from that of the fourth projected light. Alternatively, the phase of the first projected light may precede by 90° that of the second projected light, the phase of the second projected light may precede by 90° than that of the third projected light, and the phase of the third projected light may precede by 90° that of the fourth projected light.

The projected lights projected onto the object 200 may be incident on a first lens 108 after being reflected by a surface of the object 200. In general, the object 200 may have a plurality of surfaces with different distances to the device 100. For example, the object 200 may have surfaces P1 through P5 as shown in FIG. 1. However, the object 200 having five surfaces P1 through P5 with different distances is illustrated in FIG. 1 for simplicity of explanation. The number of surfaces may be more or less than five. Each of the first through third projected lights is reflected by the surfaces P1 through P5 and thus 5 reflected lights are generated with different delay times, that is, different phases. For example, five first reflected lights having different phases are generated when the first projected light is reflected by the five surfaces P1 through P5 of the object 200, five second reflected lights having different phases are generated when the second projected light is reflected by the five surfaces P1 through P5 of the object 200, and five Nth reflected lights having different phases are generated when the Nth projected light is reflected by the five surfaces P1 through P5 of the object 200. Reflected lights reflected by the surface P1 that is the farthest from the device 100 in the example of FIG. 1 reach the first lens 108 after a time delay of $\Phi_{P1}$, and reflected lights reflected by the surface P5 in the example of FIG. 1 that is the closest to the device 100 reach the first lens 108 after a time delay of $\Phi_{P5}$ that is less than $\Phi_{P1}$.

The first lens 108 focuses reflected lights within an area of the light modulator 103. The filter 109 for transmitting only light having a prescribed wavelength in order to remove background light or noisy light other than the light having the prescribed wavelength may be disposed between the first lens 108 and the light modulator 103. For example, if the light source 101 emits light having a near infrared (NIR) wavelength of about 850 nm, the filter 109 may be a NIR band pass filter for passing light having a NIR wavelength band of about 850 nm. Accordingly, lights emitted from the light source 101 and reflected by the object 200 may be mostly incident on the light modulator 103. Although the filter 109 is disposed between the first lens 108 and the light modulator 103 in FIG. 1, the present exemplary embodiment is not limited thereto, and for example, the first lens 108 may be disposed between the filter 109 and the light modulator 103. For example, an NIR light passed through the filter 109 first may be focused on the light modulator 103 by the first lens 108.

Furthermore, the light modulator 103 modulates the reflected lights with a light modulation signal having a prescribed wavelength. The waveform of the gain in the light modulator 103 may have a period that is equal to the period of each of the projected lights (e.g. the first to Nth projected lights). In FIG. 1, the light modulator 103 may modulate the five first reflected lights respectively reflected by the five surfaces P1 through P5 of the object 200 and provide five first modulated images to the imaging device 105. Likewise, the light modulator 103 may sequentially modulate the five second reflected lights and the five Nth reflected lights and provide modulated second and Nth images to the imaging device 105.

The modulated images obtained by the light modulator 103 pass through the second lens 110 where magnifications of the modulated images are adjusted, and are refocused within an area of the imaging device 105 by the second lens 110. The imaging device 105 receives the modulated images for a prescribed exposure time and generates an image. For example, as shown in FIG. 2A, the imaging device 105 may receive the modulated five first reflected lights respectively reflected by the five surfaces P1 through P5 of the object 200 for a prescribed exposure time, and generate a first image. Next, as shown in FIG. 2B, the imaging device 105 may receive the modulated five second reflected lights respectively reflected by the five surfaces P1 through P5 of the object 200 for a prescribed exposure time and may generate a second image. Next, as shown in FIG. 2C, the imaging device 105 may receive the modulated five second reflected lights respectively reflected by the five surfaces P1 through P5 of the object 200 for a prescribed exposure time and generate an N-th image. In this way, N different images may be sequentially obtained. Each of the first through Nth images may be a sub-frame image used to obtain an image of one frame having distance information. For example, if a period of one frame is "Td", an exposure time of the imaging device 105 for obtaining each of the first through Nth images may be approximately Td/N.

Referring to FIG. 2A again, the first projected light projected onto the object 200 from the light source 101 is reflected by the five surfaces P1 through P5 of the object 200 and thus the five first reflected lights are generated in a first sub-frame. The five first reflected lights are modulated by the light modulator 103 and reach the imaging device 105. In FIGS. 2A-2C, the imaging device 105 includes five pixels respectively corresponding to the five surfaces P1 through P5 of the object 200 for simplicity of explanation. Therefore, the five first reflected lights may be respectively incident on the five pixels. As shown in FIG. 2A, the five first reflected lights respectively reflected by the five surfaces P1 through P5 have different phase delays $\Phi_{P1}$ through $\Phi_{P5}$ according to distances to the device 100. For example, the imaging device 105 may capture the first reflected light approximately for the exposure time Td/N and generate the first image. By the same method, second through Nth images may be generated from a second sub frame to an Nth sub frame. As shown in FIGS. 2B and 2C, different phase delays $\Phi_{P1}$ through $\Phi_{P5}$ may be generated by the five surfaces P1 through P5 at different distances, in the second through Nth sub frames.

FIGS. 2A-2C illustrate that N different images are generated by using N different projected lights and projected lights. However, it is also possible to use an identical projected light in all the sub frames and to modulate reflected lights by the light modulator 103 with different gain waveforms in each of the sub frames. FIGS. 3A-3C illustrate that N different images are generated by using an identical projected light and N different gain waveforms. Referring to FIGS. 3A-3C, reflected lights from the object 200 have the same waveform and the same phase in all the sub frames, and have different phase delays $\Phi_{P1}$ through $\Phi_{P5}$ according to distances to the five surfaces P1 through P5 of the object 200, as described above. As shown in FIGS. 3A through 3C, in a first sub-frame, the light modulator 103 modulates the reflected lights with a first light modulation signal, in a second sub-frame, the light modulator 103 modulates the reflected lights with a second light modulation signal that is different from the first light modulation signal, and in an N sub-frame, the light modulator 103 modulates the reflected lights with an Nth light modulation signal that is different from the first and second light modulation signals. The first through Nth light modulation signals may have completely different waveforms, or may have the same period and waveform, and different phases. Accordingly, as illustrated, N different image, i.e., first through Nth images, may be obtained respectively.

The N images obtained by using the above method may be transmitted to the distance-information image processor 107. The distance-information image processor 107 may acquire distance information according to the preset algorithm by using the N images. For example, the device 100 may acquire distance information by using an averaging algorithm.

FIG. 4 illustrates a method of generating four different images by using four projected lights having different phases and acquiring distance information by using the generated four different images, according to an exemplary embodiment.

As can be known from a first part 410, the device 100 may obtain four intensity images from sequential photographing according to an exemplary embodiment. For example, the device 100 may obtain an intensity image $I_{CIS}^{(0)}$ having a phase difference of 0°, an intensity image $I_{CIS}^{(90)}$ having a phase difference of 90°, an intensity image $I_{CIS}^{(180)}$ having a phase difference of 180°, and an intensity image $I_{CIS}^{(270)}$ having a difference of 270°, according to an exemplary embodiment. According to an exemplary embodiment, the device 100 may obtain four contact image sensor (CIS) images by using a moving average. A modulated image is displayed as a CIS image in FIG. 4, but the imaging device 105 is not limited to a CIS.

According to an exemplary embodiment, the device 100 may obtain four images in the same order as the order of Equation 1.

$$\ldots \to I_{CIS}^{(0)} \to I_{CIS}^{(180)} \to I_{CIS}^{(90)} \to I_{CIS}^{(270)} \to I_{CIS}^{(0)} \to I_{CIS}^{(180)} \to \quad \text{[Equation 1]}$$

According to an exemplary embodiment, the device 100 may obtain a combination of four images as in Equation 2 by using a method of obtaining two new images and sequentially removing two existing images.

$$[I_{CIS}^{(p)}, I_{CIS}^{(p+1)}, I_{CIS}^{(p+2)}, I_{CIS}^{(p+3)}] = [I_{CIS}^{(0)}, I_{CIS}^{(180)}, I_{CIS}^{(90)}, I_{CIS}^{(270)}] \quad \text{[Equation 2]}$$

$$[I_{CIS}^{(p)}, I_{CIS}^{(p+1)}, I_{CIS}^{(p+2)}, I_{CIS}^{(p+3)}] =$$

$$[I_{CIS}^{(90)}, I_{CIS}^{(270)}, I_{CIS}^{(0)}, I_{CIS}^{(180)}] (p \text{ is any number})$$

For example, the device 100, when the currently obtained four images are $$[I_{CIS}^{(0)}, I_{CIS}^{(180)}, I_{CIS}^{(90)}, I_{CIS}^{(270)}],$$

may obtain a combination of four images of $$[I_{CIS}^{(90)}, I_{CIS}^{(270)}, I_{CIS}^{(0)}, I_{CIS}^{(180)}]$$

by sequentially removing the two previously obtained images and obtaining two new images, according to an exemplary embodiment. For example, a first image 411 may be removed and a second image 413 may be added. For example, the device 100, when the currently obtained four images are $$[I_{CIS}^{(90)}, I_{CIS}^{(270)}, I_{CIS}^{(0)}, I_{CIS}^{(180)}],$$

may obtain a combination of four images of $$[I_{CIS}^{(0)}, I_{CIS}^{(180)}, I_{CIS}^{(90)}, I_{CIS}^{(270)}]$$

by sequentially removing the two previously obtained images and obtaining two new images, according to an exemplary embodiment.

According to an exemplary embodiment, the device 100 may obtain a depth image by using currently obtained four images 412 as in Equation 3. The currently obtained four images 412 may include four intensity images.

In detail, as can be known from a second part 422, the device 100 may obtain a first intermediate image 421 denoted by $I_{CIS}^{(270)} - I_{CIS}^{(90)}$ and a second intermediate image 422 denoted by $I_{CIS}^{(90)} - I_{CIS}^{(180)}$, according to an exemplary embodiment. Furthermore, as can be known from a third part 430, the device 100 may obtain a depth image 431 by using the first intermediate image 421 and the second intermediate image 422, according to an exemplary embodiment.

$$\Rightarrow \text{depth} = \frac{c}{4\pi f} \tan^{-1}\left(\frac{-I_{CIS}^{(90)} + I_{CIS}^{(270)}}{I_{CIS}^{(0)} - I_{CIS}^{(180)}}\right) \quad \text{[Equation 3]}$$

Therefore, according to an exemplary embodiment, the device 100 may obtain one depth image while obtaining two infrared (IR) images during the same period of time.

Figure 5:
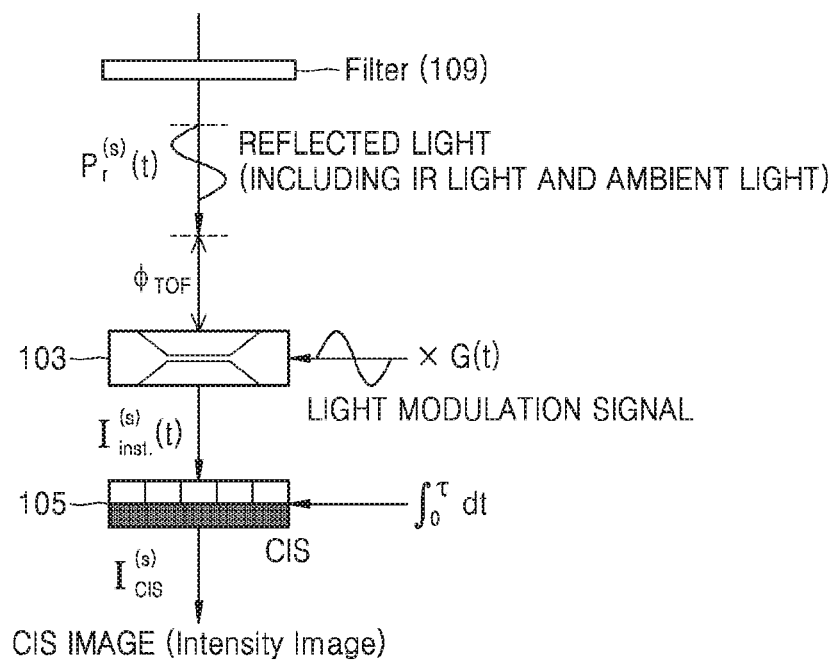
FIG. 5 is a view illustrating a method of obtaining a contact image sensor (CIS) image by using a reflected light and a light modulation signal, according to an exemplary embodiment.

FIG. 5 is a view illustrating a method of obtaining a CIS image by using a reflected light and a light modulation signal. FIG. 5 illustrates light processing of an IR light.

In the specification, $P_e^{(s)}$ may indicate an optical power of an Sth projected light, $\theta^{(s)}$ may indicate a phase difference of the Sth projected light, $\overline{P}_{ave}$ may indicate an DC offset of emitted light, $P_e^{(s)}$ may indicate an optical power of an Sth received reflected light, $\overline{P}_a$ may indicate received ambient light, r may indicate light attenuation of a surface of an object, G may indicate a shutter gain, $\overline{G}_{ave}$ may indicate a shutter gain DC offset, w may indicate an operating frequency, $\phi_{TOF}$ may indicate phase delay due to a time of flight (TOF) method.

The optical power of the Sth projected light may be denoted as Equation 4.

$$P_e^{(s)}(t) = a \cdot rect(\omega t - \theta^{(s)}) + \overline{P}_{ave}, \quad s=1,2,\ldots,4 \quad \text{[Equation 4]}$$

"rect" in Equation 4 may be a square wave AC in which a DC component is added.

A reflected light $P_r^{(s)}$ after passing through a filter may be denoted as Equation 5. As the reflected light after passing through a filter returns reflected by a surface of an object, the reflected light may be multiplied by r, which is a reflection degree fully considering a degree of surface reflection of an object, a lens size, etc., and a phase difference due to a TOF method and an ambient light may exist.

$$P_r^{(s)}(t) = r[a \cdot rect(\omega t - \theta^{(s)} - \emptyset_{TOF}) + \overline{P}_{ave}] + r\overline{P}_a \quad \text{[Equation 5]}$$

A modulation waveform Gain of a shutter may be denoted as Equation 6.

$$G(t) = c \sin(\omega t) + \overline{G}_{ave} \quad \text{[Equation 6]}$$

For example, a modulation waveform G(t) of a shutter may be a sinusoidal wave AC in which a DC component is added.

Light reaching an imaging device 105 may be denoted as Equation 7.

$$I_{inst.}^{(s)}(t) = \quad \text{[Equation 7]}$$
$$P_r^{(s)}(t) \times G(t) = r[a \cdot rect(\omega t - \theta^{(s)} - \emptyset_{TOF}) + (\overline{P}_{ave} + \overline{P}_a)] \times$$
$$[c \sin(\omega t) + \overline{G}_{ave}], \quad s = 1, 2, \ldots, 4$$

An image obtained from the imaging device 105 may be denoted as Equation 8.

$$I_{CIS}^{(s)} = \frac{1}{T} \int_0^T I_{inst.}^{(s)}(it) dt = \quad \text{[Equation 8]}$$
$$\frac{rac}{2\pi} \left[ \int_{\theta^{(s)} + \emptyset_{TOF}}^{\theta^{(s)} + \emptyset_{TOF} + \pi} (1) \cdot \sin \cdot \omega t d\omega t + \int_{\theta^{(s)} + \emptyset_{TOF} + \pi}^{\theta^{(s)} + \emptyset_{TOF} + 2\pi} (-1) \cdot \right.$$
$$\left. \sin \omega t d\omega t \right] + r(\overline{P}_{ave} - \overline{P}_a) \overline{G}_{ave} =$$
$$\frac{rac}{2\pi} [-\cos(\theta^{(s)} + \emptyset_{TOF} + \pi) + \cos(\theta^{(s)} + \emptyset_{TOF}) +$$
$$\cos(\theta^{(s)} + \emptyset_{TOF} + 2\pi) - \cos(\theta^{(s)} + \emptyset_{TOF} + \pi)] +$$
$$r(\overline{P}_{ave} + \overline{P}_a) \overline{G}_{ave} =$$
$$\frac{rac}{\pi} [-\cos(\theta^{(s)} + \emptyset_{TOF} + \pi) + \cos(\theta^{(s)} + \emptyset_{TOF})] +$$
$$r(\overline{P}_{ave} + \overline{P}_a) \overline{G}_{ave} =$$
$$r \cdot \frac{2}{\pi} \cdot ac \cdot \cos(\theta^{(s)} + \emptyset_{TOF}) + r \cdot (\overline{P}_{ave} + \overline{P}_a) \overline{G}_{ave} =$$
$$rA \cdot \cos(\theta^{(s)} + \emptyset_{TOF}) + rB, \quad s = 1, 2, \ldots, 4$$

Four images continuously obtained from Equation 8 may be denoted as Equations 9 through 12.

$$I_{CIS}^{(0)} = rA \cos \emptyset_{TOF} + rB \quad \text{[Equation 9]}$$

$$I_{CIS}^{(180)} = rA \cos \emptyset_{TOF} + rB \quad \text{[Equation 10]}$$

$$I_{CIS}^{(90)} = rA \sin \emptyset_{TOF} + rB \quad \text{[Equation 11]}$$

$$I_{CIS}^{(270)} = rA \sin \emptyset_{TOF} + rB \quad \text{[Equation 12]}$$

Furthermore, Equations 9 through 12 may satisfy a condition of Equation 13.

$$A = \frac{2}{\pi} \cdot ac, \quad \text{[Equation 13]}$$
$$B = (\overline{P}_{ave} + \overline{P}_a) \overline{G}_{ave}$$

Even when the optical power of the Sth projected light denoted in Equation 4 is realized as a triangular wave (sine), the above equation is possible, as a result, A may be a different value A'. For example, A' may be denoted as Equation 14.

$$A' = \frac{1}{2} \cdot ac \quad \text{[Equation 14]}$$

When $\phi_{TOF}$ is solved after deleting unknown numbers r, A, and B in Equations 9 through 12, phase differences according to a depth may be obtained as Equation 3 or Equation 15.

$$\emptyset_{TOF} = \tan^{-1} \left( \frac{-I_{CIS}^{(90)} + I_{CIS}^{(270)}}{I_{CIS}^{(0)} - I_{CIS}^{(180)}} \right) \quad \text{[Equation 15]}$$

Equations 9 through 15 may be applied to a still image. For example, Equations 9 through 15 may be applied to a still object.

Furthermore, Equation 16 may be obtained from Equations 3 through 15.

$$depth = \frac{C}{4\pi f} \emptyset_{TOF} = \frac{C}{4\pi f} \tan^{-1} \left( \frac{I^{(270)} - I^{(90)}}{I^{(0)} - I^{(180)}} \right) \quad \text{[Equation 16]}$$

Figure 6:
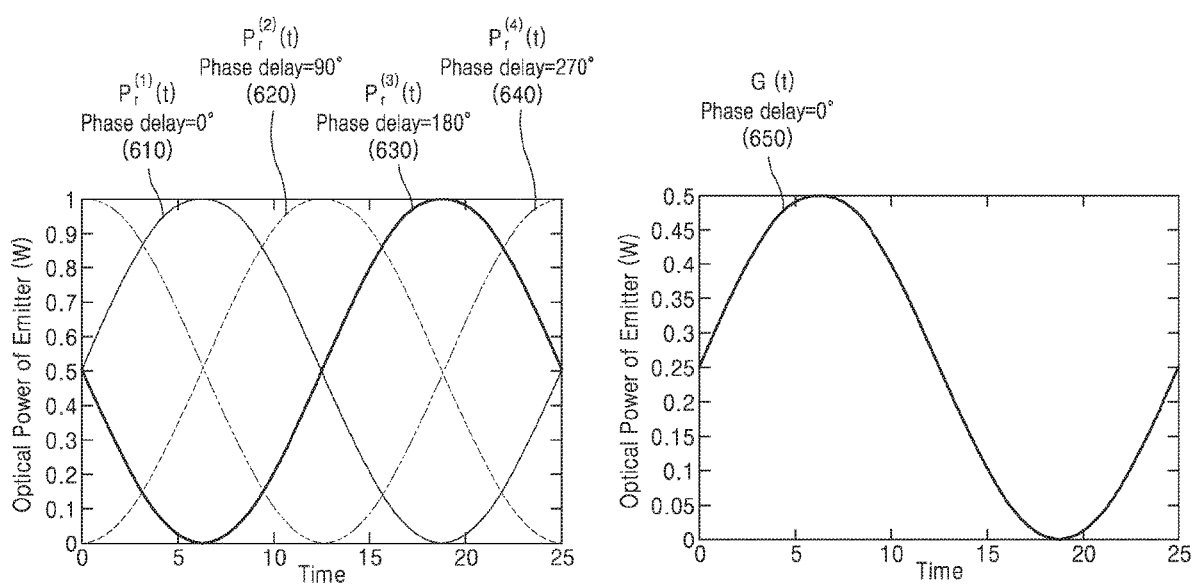
FIG. 6 is a view illustrating an example of four projected lights with different phases, according to an exemplary embodiment.

FIG. 6 is a view illustrating an example of four projected lights with different phases, according to an exemplary embodiment.

According to an exemplary embodiment, four different projected lights may be a first projected light 610, a second projected light 620, a third projected light 630, and a fourth projected light 640. Each phase of the first through fourth projected lights may be different by 90°. For example, a phase delay of the first projected light 610 may be 0°, a phase delay of the second projected light 620 may be 90°, a phase delay of the third projected light 630 may be 180°, and a phase delay of the fourth projected light 640 may be 270°.

According to an exemplary embodiment, a modulation waveform G(t) 650 of a shutter may be a sinusoidal wave AC in which a DC component is added.

Figure 7:
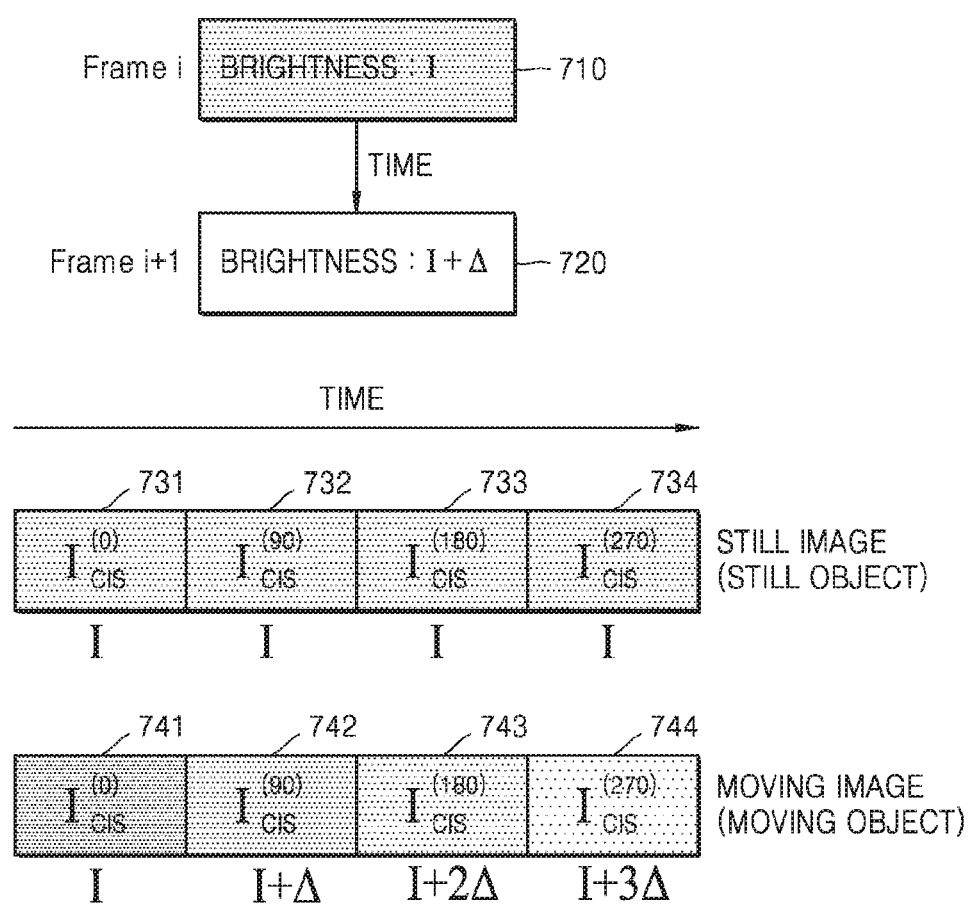
FIG. 7 is a view illustrating a brightness change of an image obtained by four projected lights with different phases, according to an exemplary embodiment.

FIG. 7 is a view illustrating a brightness change of an image obtained by four projected lights with different phases, according to an exemplary embodiment.

A brightness of a reflected light, which is reflected by the object, may change over time. For example, when a brightness of an ith frame 710 is I, a brightness of an i+1th frame 720 may be I+A over time. The brightness of the ith frame 710, which is obtained by continuously photographing, may be different from the brightness of the i+1th frame 720.

A case will now be described in which the first through fourth projected lights 610 through 640 are sequentially projected onto the object when a phase delay of the first projected light 610 is 0°, a phase delay of the second projected light 620 is 90°, a phase delay of the third projected light 630 is 180°, and a phase delay of the fourth projected light 640 is 270°.

According to an exemplary embodiment, if there is no change in a brightness of a reflected light, which is reflected by an object, even over time, brightnesses of a first frame 731 obtained by the first projected light 610, a second frame 732 obtained by the second projected light 620, a third frame 733 obtained by the third projected light 630, and a fourth frame 734 obtained by the fourth projected light 640 may be the same as each other.

According to an exemplary embodiment, if there is a change in a brightness of a reflected light, which is reflected by the object, over time, brightnesses of a first frame 741 obtained by the first projected light 610, a second frame 742 obtained by the second projected light 620, a third frame 743 obtained by the third projected light 630, and a fourth frame 744 obtained by the fourth projected light 640 may be different from each other. For example, it may become brighter in an order of first to fourth frames 741 to 744. For example, when a brightness of the first frame 741 is I, a brightness of the second frame 742 may be I+Δ, a brightness of the third frame 743 may be I+2Δ, and a brightness of the fourth frame 744 may be I+3Δ. A change in the brightnesses may occur when light irradiated to an object changes or an object moves, but the inventive concept is not limited thereto.

According to an exemplary embodiment, if there is a change in a brightness of a reflected light, which is reflected by an object, over time, Equations 9 through 12 may be denoted as Equation 17.

$$I_{CIS}^{(0)} = rA \cos \varnothing_{TOF} + rB$$

$$I_{CIS}^{(90)} = rA \sin \varnothing_{TOF} + rB + \Delta$$

$$I_{CIS}^{(180)} = rA \cos \varnothing_{TOF} + rB + 2\Delta$$

$$I_{CIS}^{(270)} = rA \sin \varnothing_{TOF} + rB \times 3\Delta \quad \text{[Equation 17]}$$

Equation 16 may be denoted as Equation 18 as reflecting Equation 17.

$$\text{depth} = \quad \text{[Equation 18]}$$

$$\frac{CT_e}{4\pi} \tan^{-1}\left(\frac{I^{(270)} - I^{(90)}}{I^{(0)} - I^{(180)}}\right) = \frac{CT_e}{4\pi} \tan^{-1}\left(\frac{rA\sin\varnothing_{TOF} + 2\Delta}{rA\cos\varnothing_{TOF} - 2\Delta}\right)$$

As disclosed in Equation 18, different characters may be assigned in a denominator and a fraction of Equation 18 respectively due to a brightness change rate A, and thus, an error may occur when a depth is calculated. Therefore, as the brightness change rate A or a movement of an object is greater, motion blur may be larger.

According to an exemplary embodiment, the device 100 may control a projecting order of projected lights and may acquire distance information with reduced motion blur.

Figure 8:
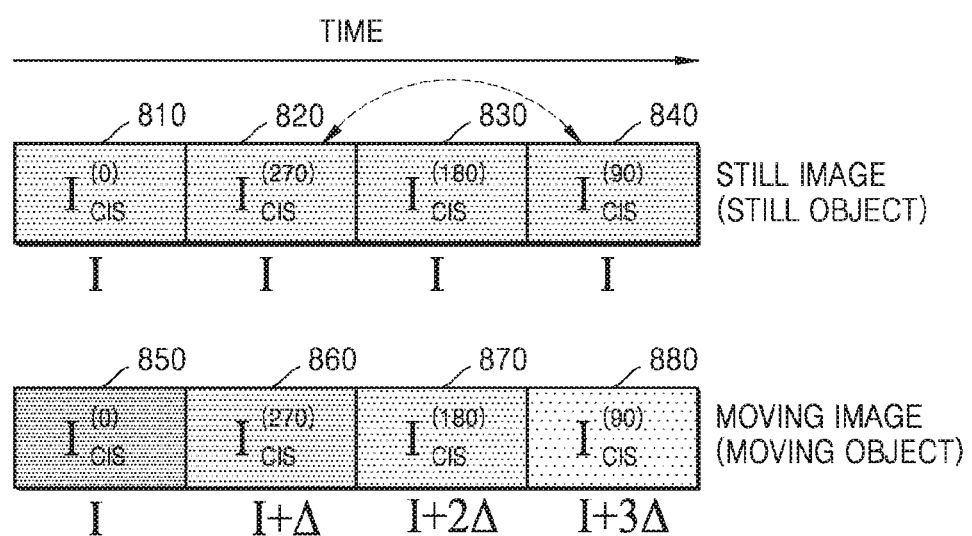
FIG. 8 is a view illustrating an example of controlling a projecting order of projected lights when an object moves and acquiring distance information, according to an exemplary embodiment.

FIG. 8 is a view illustrating an example of controlling a projecting order of projected lights when an object moves and acquiring distance information.

According to an exemplary embodiment, the device 100 may control a projecting order of projected lights. For example, the device 100 may switch the projecting order of projected lights, according to an exemplary embodiment. For example, the device 100 may switch a projecting order of the second projected light 620 and the fourth projected light 640, and may sequentially project an object with the first projected light 610, the fourth projected light 640, the third projected light 630, and the second projected light 620 in order, according to an exemplary embodiment.

According to an exemplary embodiment, a case will be described in which the device 100 controls a projecting order of projected lights and sequentially projects an object with the first projected light 610, the fourth projected light 640, the third projected light 630, and the second projected light 620 in order.

According to an exemplary embodiment, if there is no change in a brightness of a reflected light, which is reflected by an object, even over time, brightnesses of a first frame 810 obtained by the first projected light 610, a second frame 820 obtained by the fourth projected light 640, a third frame 830 obtained by the third projected light 630, and a fourth frame 840 obtained by the second projected light 620 may be the same as each other.

According to an exemplary embodiment, if there is a change in a brightness of a reflected light, which is reflected by the object, over time, brightnesses of a first frame 850 obtained by the first projected light 610, a second frame 860 obtained by the fourth projected light 640, a third frame 870 obtained by the third projected light 630, and a fourth frame 880 obtained by the second projected light 620 may be different from each other. For example, it may become brighter in an order of first to fourth frames 850 to 880. For example, when a brightness of the first frame 850 is I, a brightness of the second frame 860 may be I+Δ, a brightness of the third frame 870 may be I+2Δ, and a brightness of the fourth frame 880 may be I+3Δ. A change in brightness may occur when light irradiated to an object changes or an object moves, but the inventive concept is not limited thereto.

According to an exemplary embodiment, if there is a change in a brightness of a reflected light, which is reflected by an object, over time, Equations 9 through 12 may be denoted as Equation 19.

$$I_{CIS}^{(0)} = rA \cos \varnothing_{TOF} + rB$$

$$I_{CIS}^{(90)} = rA \sin \varnothing_{TOF} + rB + 3\Delta$$

$$I_{CIS}^{(180)} = rA \cos \varnothing_{TOF} + rB + 2\Delta$$

$$I_{CIS}^{(270)} = rA \sin \varnothing_{TOF} + rB \times \Delta \quad \text{[Equation 19]}$$

Equation 16 may be denoted as Equation 20 as reflecting Equation 19.

$$\text{depth} = \quad \text{[Equation 20]}$$

$$\frac{CT_e}{4\pi} \tan^{-1}\left(\frac{I^{(270)} - I^{(90)}}{I^{(0)} - I^{(180)}}\right) = \frac{CT_e}{4\pi} \tan^{-1}\left(\frac{rA\sin\varnothing_{TOF} - 2\Delta}{rA\cos\varnothing_{TOF} - 2\Delta}\right)$$

As shown in Equation 20, identical characters may be assigned in a denominator and a fraction of Equation 20 respectively due to a brightness change rate A. Therefore, the device 100 may reduce an error in a depth calculation result such that the error is less than in Equation 18 by controlling a projecting order of projected lights, and thus, may reduce a motion blur effect.

Figure 9:
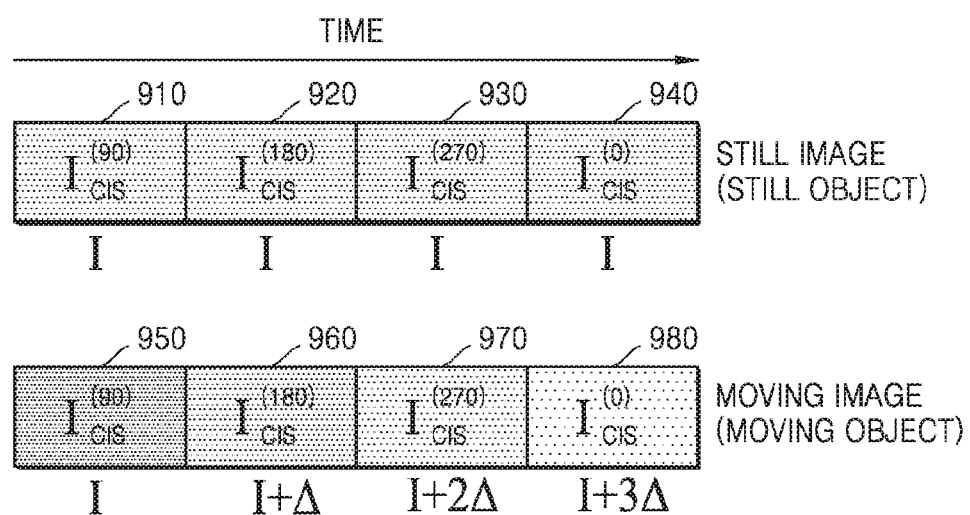
FIG. 9 is a view illustrating another example of controlling a projecting order of projected lights when an object moves and acquiring distance information, according to an exemplary embodiment.

FIG. 9 is a view illustrating another example of controlling a projecting order of projected lights when an object moves and acquiring distance information, according to an exemplary embodiment.

According to an exemplary embodiment, the device 100 may control a projecting order of projected lights. For example, the device 100 may generally shift phase differences of projected lights according to an exemplary embodiment. For example, the device 100 may sequentially project an object with the second projected light 620, the third projected light 630, the fourth projected light 640, and the first projected light 610 in order, according to an exemplary embodiment.

According to an exemplary embodiment, a case will be described in which the device 100 controls a projecting order of projected lights and sequentially projects an object with the second projected light 620, the third projected light 630, the fourth projected light 640, and the first projected light 610 in order.

According to an exemplary embodiment, if there is no change in a brightness of a reflected light, which is reflected by an object, even over time, brightnesses of a first frame 910 obtained by the second projected light 620, a second frame 920 obtained by the third projected light 630, a third frame 930 obtained by the fourth projected light 640, and a fourth frame 940 obtained by the first projected light 610 may be the same as each other.

According to an exemplary embodiment, if there is a change in a brightness of a reflected light, which is reflected by an object, over time, brightnesses of a first frame 950 obtained by the second projected light 620, a second frame 960 obtained by the third projected light 630, a third frame 970 obtained by the fourth projected light 640, and a fourth frame 980 obtained by the first projected light 610 may be different from each other. For example, it may become brighter in an order of first to fourth frames 950 to 980. For example, when a brightness of the first frame 950 is I, a brightness of the second frame 960 may be I+$\Delta$, a brightness of the third frame 970 may be I+2$\Delta$, and a brightness of the fourth frame 980 may be I+3$\Delta$. A change in brightness may occur when light irradiated to an object changes or an object moves, but the inventive concept is not limited thereto.

According to an exemplary embodiment, if there is a change in a brightness of a reflected light, which is reflected by an object, over time, Equations 9 through 12 may be denoted as Equation 21.

$$I_{CIS}^{(0)} = rA\cos\varnothing_{TOF} + rB \times 3\Delta$$

$$I_{CIS}^{(90)} = rA\sin\varnothing_{TOF} + rB$$

$$I_{CIS}^{(180)} = rA\cos\varnothing_{TOF} + rB + \Delta$$

$$I_{CIS}^{(270)} = rA\sin\varnothing_{TOF} + rB \times 2\Delta \quad \text{[Equation 21]}$$

Equation 16 may be denoted as Equation 22 as reflecting Equation 21.

$$\text{depth} = \frac{CT_e}{4\pi}\tan^{-1}\left(\frac{I^{(270)} - I^{(90)}}{I^{(0)} - I^{(180)}}\right) = \frac{CT_e}{4\pi}\tan^{-1}\left(\frac{rA\sin\varnothing_{TOF} + 2\Delta}{rA\cos\varnothing_{TOF} + 2\Delta}\right) \quad \text{[Equation 22]}$$

As shown in Equation 22, identical characters may be assigned in a denominator and a fraction of Equation 22 respectively due to a brightness change rate A. Therefore, the device 100 may reduce an error in a depth calculation result such that the error is less than in Equation 18 by controlling a projecting order of projected lights, and thus, may reduce a motion blur effect.

The methods of controlling a projecting order of projected lights illustrated in FIGS. 8 and 9 are only examples, and the method of controlling a projecting order of projected lights by the device 100 is not limited to the examples illustrated in FIGS. 8 and 9. For example, in the case of four projected lights, the device 100 may determine a projecting order of the four projected lights as one order from among 24 projecting orders obtained from the factorial of 4.

Figure 10:
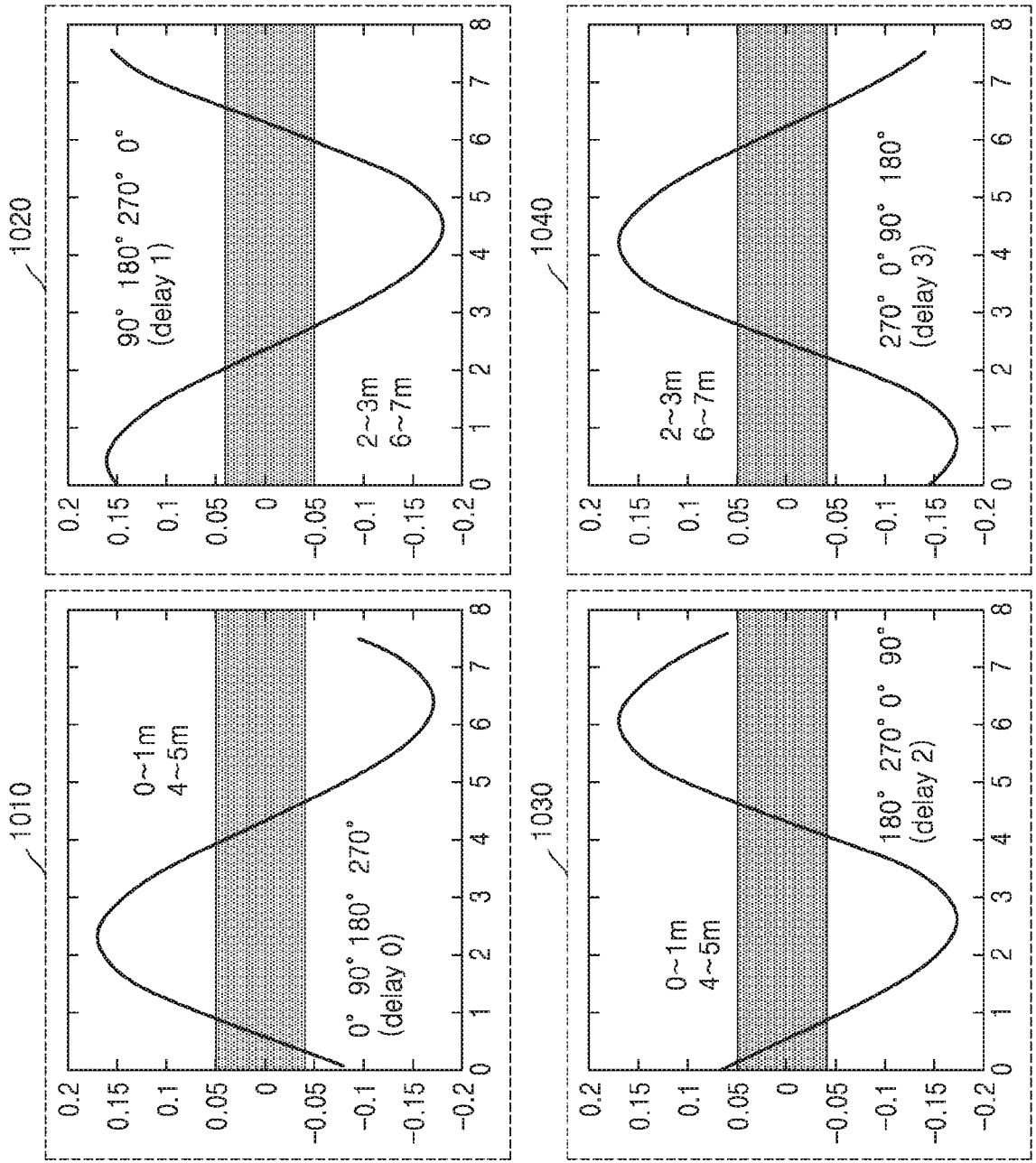
FIG. 10 is a view illustrating a method of determining a projecting order of projected lights according to a distance between an object and a device, according to an exemplary embodiment.

FIG. 10 is a view illustrating a method of determining a projecting order of projected lights according to a distance between an object and a device, according to an exemplary embodiment.

According to an exemplary embodiment, the device 100 may determine a projecting order of projected lights according to a distance between an object and the device 100.

According to an exemplary embodiment, when the distance between the object and the device 100 is 0 to 1 m, or 4 m to 5 m, the device 100 may sequentially project the object with the first projected light 610, the second projected light 620, the third projected light 630, and the fourth projected light 640 in order without shifting a phase difference. When the distance between the object and the device 100 is 0 to 1 m, or 4 m to 5 m, the device 100 may determine a projecting order of the projected lights for reducing motion blur through a first graph 1010, according to an exemplary embodiment.

According to an exemplary embodiment, when the distance between the object and the device 100 is 2 m to 3 m, or 6 m to 7 m, the device 100 may sequentially project the object with the second projected light 620, the third projected light 630, the fourth projected light 640, and the first projected light 610 in order by shifting a phase difference once to the left. When the distance between the object and the device 100 is 2 m to 3 m, or 6 m to 7 m, the device 100 may determine a projecting order of the projected lights for reducing motion blur through a second graph 1020, according to an exemplary embodiment.

According to an exemplary embodiment, when the distance between the object and the device 100 is 0 to 1 m, or 4 m to 5 m, the device 100 may sequentially project the object with the third projected light 630, the fourth projected light 640, the first projected light 610, and the second projected light 620 in order by shifting a phase difference twice to the left. When the distance between the object and the device 100 is 0 to 1 m, or 4 m to 5 m, the device 100 may determine a projecting order of the projected lights for reducing motion blur through a third graph 1030, according to an exemplary embodiment.

According to an exemplary embodiment, when the distance between the object and the device 100 is 2 m to 3 m, or 6 m to 7 m, the device 100 may sequentially project the object with the fourth projected light 640, the first projected light 610, the second projected light 620, and the third projected light 630 in order by shifting a phase difference three times to the left. When the distance between the object and the device 100 is 2 m to 3 m, or 6 m to 7 m, the device 100 may determine a projecting order of the projected lights for reducing motion blur through a fourth graph 1040, according to an exemplary embodiment.

The projecting order of projected lights according to a distance illustrated in FIG. 10 is only an example, and an operating range of the device 100 is not limited to the example illustrated in FIG. 10.

Figure 11:
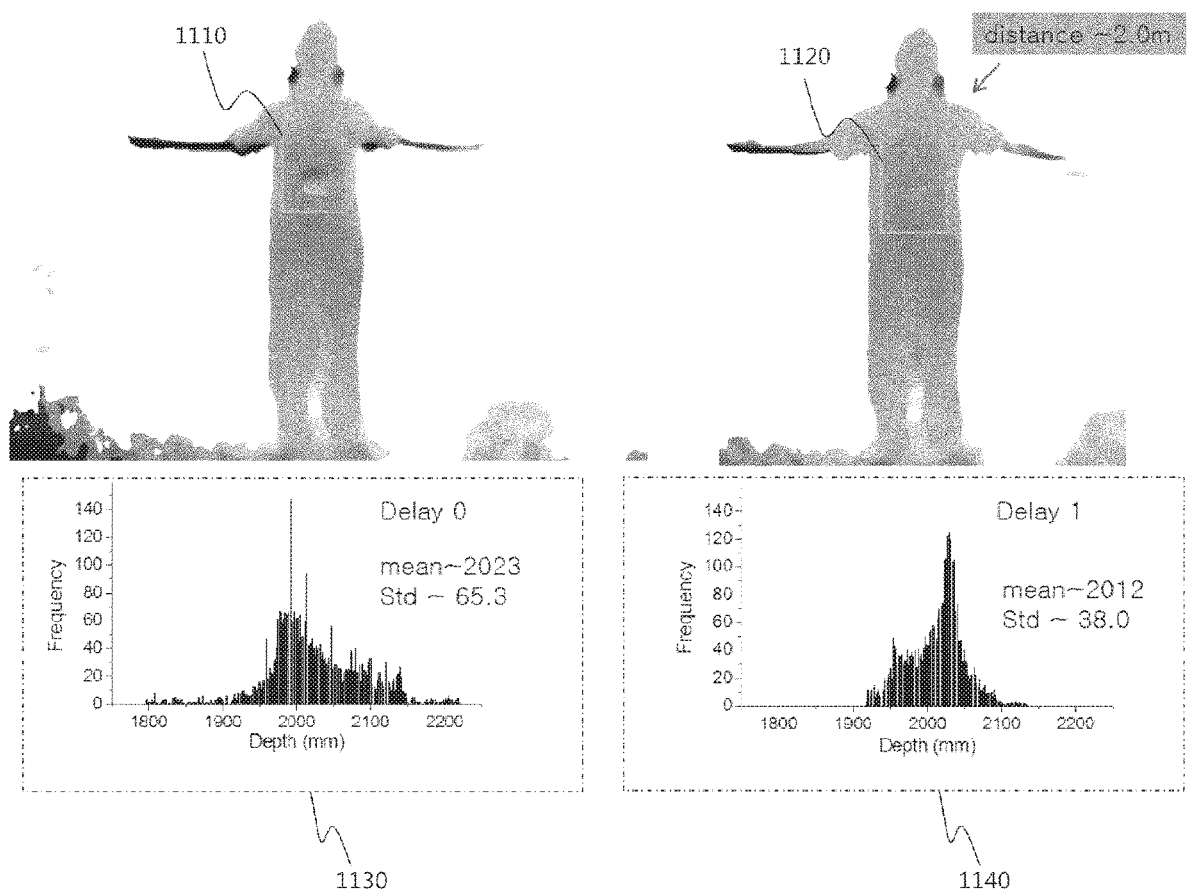
FIG. 11 is a view illustrating an example of controlling a projecting order of projected lights according to a distance between an object and a device and acquiring distance information, according to an exemplary embodiment.

FIG. 11 is a view illustrating an example of controlling a projecting order of projected lights according to a distance between an object and a device and acquiring distance information, according to an exemplary embodiment.

When the object is at a distance of 2 m from the device 100, the device 100 may sequentially project the object with the first projected light 610, the second projected light 620, the third projected light 630, and the fourth projected light 640 in order, according to an exemplary embodiment. A change in the distance between the object and the device 100 in a first test region 1110 is not great. However, when the object moves, a change in the distance is recognized in the first test region 1110. Furthermore, it can be seen that standard deviation of the change is 65.3 mm through a first graph 1130.

When the object is at a distance of 2 m from the device 100, the device 100 may sequentially project the object with the second projected light 620, the third projected light 630, the fourth projected light 640, and the first projected light 610 in order, according to an exemplary embodiment. A change in the distance between the object and the device 100 in a second test region 1120 is not great. However, when the object moves, a change in the distance is recognized in the first test region 1120. However, it can be seen that the change in the distance, which is recognized by changing the projecting order of projected lights, is reduced. Furthermore, it can be seen that standard deviation of the change is 38 mm through a second graph 1140. In other words, the standard deviation is reduced between the first graph 1130 and the second graph 1140.

Therefore, the device 100 may reduce a motion blur effect by controlling the projecting order of projected lights, according to an exemplary embodiment.

For example, the device 100 may determine a projecting order of projected lights according to a distance between an object and the device 100 and may project the object with the projected lights, according to an exemplary embodiment. Here, the device 100 may acquire information about a distance between the object and the device 100 in real time, may determine a projecting order of projected lights according to the distance information acquired in real time, and may project the object with the projected lights.

Alternatively, the device 100 may determine a projecting order of projected lights according to an input received from outside and may project the object with the projected lights, according to an exemplary embodiment.

Figure 12:
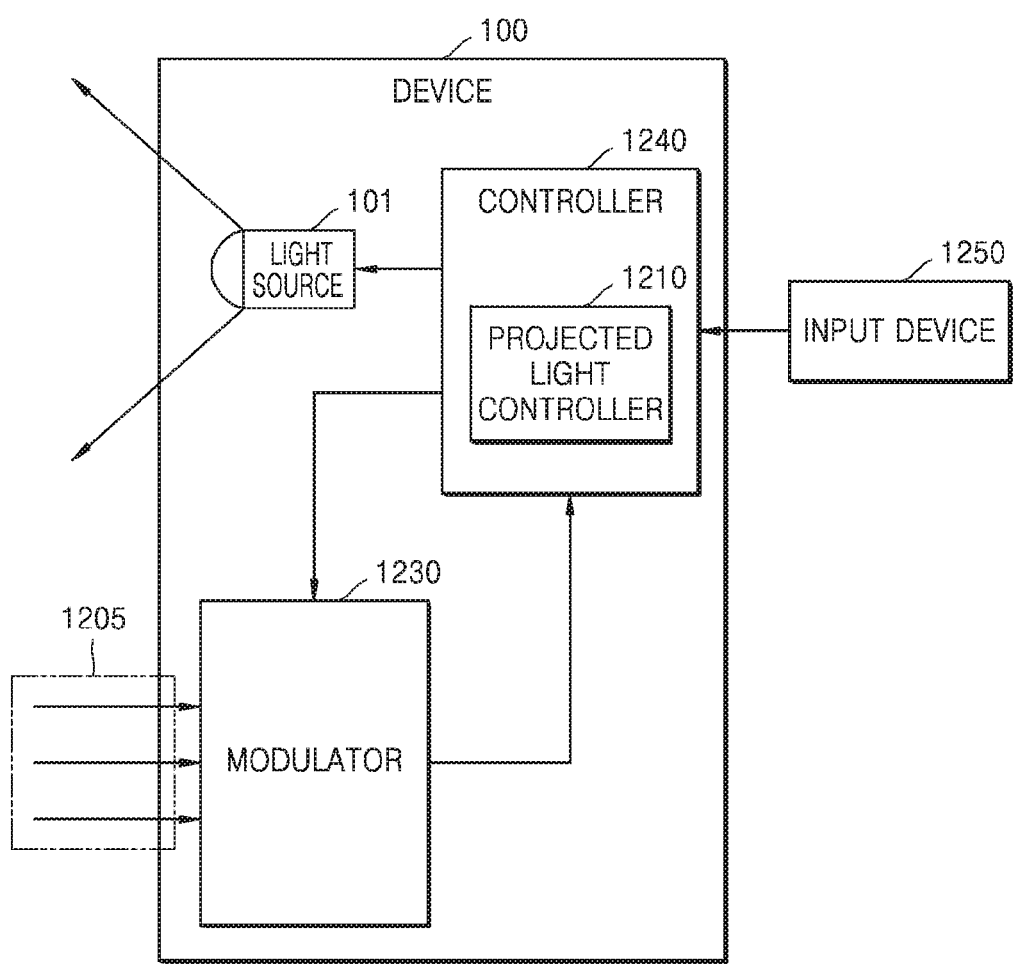
FIG. 12 is a block diagram illustrating a configuration of a device, according to an exemplary embodiment.
Figure 13:
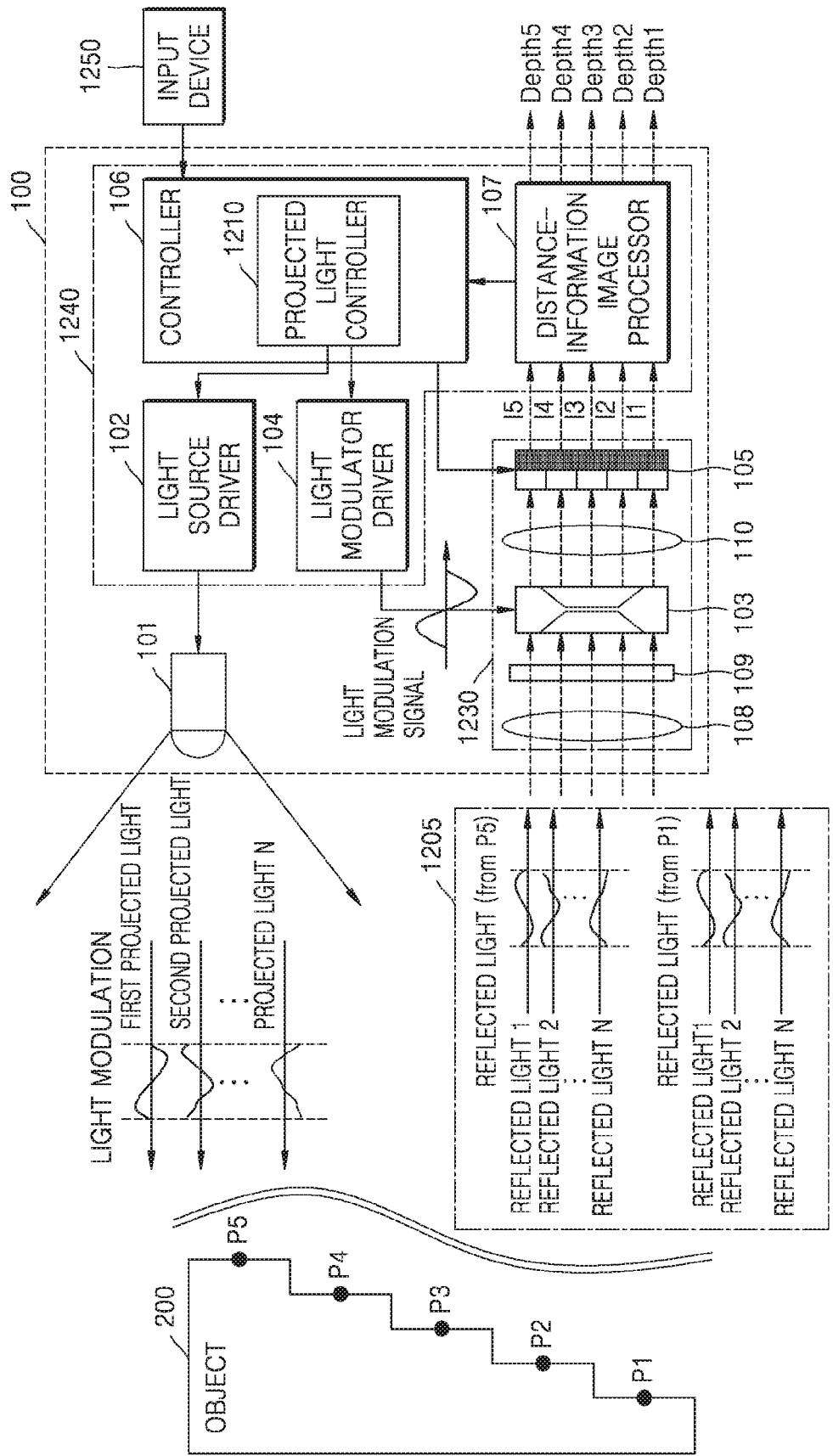
FIG. 13 is a schematic view illustrating an exemplary structure of a device acquiring distance information by being controlled by projected lights, according to an exemplary embodiment.

FIGS. 12 and 13 illustrate a device 100 according to various exemplary embodiments. The device 100 may perform the above method of acquiring distance information and may realize any exemplary embodiment of the methods of acquiring distance information disclosed in FIGS. 1 through 11 and FIGS. 14 through 16.

FIG. 12 is a block diagram illustrating a configuration of the device 100 according to an exemplary embodiment.

As illustrated in FIG. 12, the device 100 may include a light source 101, a controller 1240, and modulator 1230 according to an exemplary embodiment. However, the number of components of the device 100 may be greater or less than that illustrated in FIG. 12. The device 100 may include the light source 101, the controller 1240, the modulator 1230, and an input device 1250 according to an exemplary embodiment. Furthermore, the controller 1240 may include a projected light controller 1210.

Hereinafter, the components will be sequentially described.

According to an exemplary embodiment, the projected light controller 1210 may determine a projecting order of N (where N is a natural number equal to or greater than 3) different projected lights to be sequentially projected onto an object, based on a position of the object and/or an external input.

The N different projected lights may be periodic waves having an identical period and at least one of different sizes and different phases.

According to an exemplary embodiment, the light source 101 may sequentially project an object with four projected lights having respective phases by the controller 1240. For example, the first to fourth projected lights may have the same period, waveform, and size and different phases. For example, a phase of the first projected light may be delayed by 90° from that of the second projected light, a phase of the second projected light may be delayed by 90° from that of the third projected light, and a phase of the third projected light may be delayed by 90° from that of the fourth projected light. Alternatively, a phase of the first projected light may precede by 90° than that of the second projected light, a phase of the second projected light may precede by 90° than that of the third projected light, and a phase of the third projected light may precede by 90° than that of the fourth projected light.

According to an exemplary embodiment, the modulator 1230 may obtain a depth image by using three sub frame images, three CIS images or three CCD images, and furthermore, by using a phase difference of a light wave according to a TOF method, a reflection degree of an object surface, and ambient light.

According to an exemplary embodiment, the modulator 1230 may obtain a depth image with reduced motion blur by using four sub frame images, four CIS images or four CCD images. When the modulator 1230 obtains the depth image by using the four CIS images, the four CIS images may be obtained by four projected lights having phase differences different from each other, respectively. For example, the first to fourth projected lights may have the same period, waveform, and size and different phases by 90°.

According to an exemplary embodiment, the projected light controller 1210 may determine a projecting order of N (where N is a natural number equal to or greater than 3) different projected lights to be sequentially projected onto an object, based on a position of the object. For example, the projected light controller 1210 may determine a projecting order of projected lights according to a distance between an object and the device 100 and may control the light source 101 to project the object with the projected lights in the determined projecting order.

According to an exemplary embodiment, the projected light controller 1210 may determine a projecting order corresponding to a distance between the device 100 and an object from among a plurality of preset projecting orders of projected lights as a projecting order of projected lights to be sequentially projected onto the object from the light source 101. For example, when N is four, 24 projecting orders may correspond to preset distances, respectively, and the projected light controller 1210 may determine a projecting order corresponding to a distance between the device 100 and an object from among the 24 projecting orders as a projecting order of projected lights to be sequentially projected onto the object from the light source 101. For example, the projected light controller 1210 may determine the first projecting order as a projecting order of projected lights when the distance between the device 100 and the object is less than 1 m, the second projecting order as a projecting order of projected lights when the distance between the device 100 and the object is 2 m to 3 m, and the third projecting order as a projecting order of projected lights when the distance between the device 100 and the object is 3 m to 4 m, etc.

According to an exemplary embodiment, the projected light controller 1210 may determine a projecting order to minimize motion blur of an object from among the preset projecting orders as a projecting order of projected lights. For example, the projected light controller 1210 may determine a projecting order to minimize motion blur of an object from among the preset projecting orders as a projecting order of projected lights, based on a position of the object and/or an external input.

According to an exemplary embodiment, the light source 101 may sequentially project an object with N different projected lights in the determined projecting order that is determined by the projected light controller 1210.

For example, the light source 101 may sequentially project an object with the first projected light 610, the second projected light 620, the third projected light 630, and the fourth projected light 640 in the determined projecting order that is determined by the projected light controller 1210.

For example, the light source 101 may sequentially project an object with the first projected light 610, the fourth projected light 640, the third projected light 630, and the second projected light 620 in the determined projecting order that is determined by the projected light controller 1210.

For example, the light source 101 may sequentially project an object with the third projected light 630, the second projected light 620, the first projected light 610, and the fourth projected light 640 in the determined projecting order that is determined by the projected light controller 1210.

For example, the light source 101 may sequentially project an object with the second projected light 620, the third projected light 630, the fourth projected light 640, and the first projected light 610 in the determined projecting order that is determined by the projected light controller 1210.

For example, the light source 101 may sequentially project an object with the third projected light 630, the fourth projected light 640, the first projected light 610, and the second projected light 620 in the determined projecting order that is determined by the projected light controller 1210.

For example, the light source 101 may sequentially project an object with the fourth projected light 640, the first projected light 610, the second projected light 620, and the third projected light 630 in the determined projecting order that is determined by the projected light controller 1210.

The determined projecting order illustrated in FIG. 12 is an example, and is not limited to the exemplary embodiments illustrated in the present figures.

According to an exemplary embodiment, the modulator 1230 may obtain N modulated reflected lights by modulating N reflected lights 1205 that are reflected by an object.

According to an exemplary embodiment, the modulator 1230 may obtain the reflected lights 1205, which are N different projected lights projected from the light source 101 and reflected by an object. The modulator 1230 may modulate the obtained reflected lights 1205 and may obtain N modulated reflected lights.

The modulator 1230 may modulate the obtained reflected lights 1205 by using a light modulation signal having a gain waveform and may obtain the N modulated reflected lights. The light modulation signal may include periodic waves having a same period as the projected lights.

A specific method of modulating and obtaining the reflected lights 1205 was described in FIGS. 1 through 3 in detail.

According to an exemplary embodiment, the controller 1240 may acquire information about a distance between the device 100 and the object based on the N modulated reflected lights obtained by the modulator 1230.

For example, the controller 1240 may obtain a three-dimensional image or a depth image with respect to an object based on the N modulated reflected lights obtained by the modulator 1230.

A specific method of obtaining a three-dimensional image or a depth image with respect to an object by using modulated reflected lights was described in FIGS. 1 through 3 in detail.

Motion blur may occur when an object changes over time such as when the object moves, when intensity of ambient light irradiating the object changes, and when a reflection degree of an object surface changes over time.

According to an exemplary embodiment, the controller 1240, when projecting a plurality of projected lights in the determined projecting order that is determined by the projected light controller 1210, may obtain a depth image having less motion blur than when projecting a plurality of projected lights in a uniform projecting order.

Furthermore, as described above in FIGS. 4 through 11, the projected light controller 1210 may determine a projecting order for reducing motion blur from among a plurality of projecting orders, according to an exemplary embodiment. According to an exemplary embodiment, the light source 101 may obtain a depth image by projecting projected lights in the determined projecting order, by obtaining the reflected lights 1205, which are obtained by reflecting the projected lights, and by modulating the obtained reflected lights 1205. Here, according to an exemplary embodiment, the controller 1240 may obtain a depth image having less motion blur than when projecting a plurality of projected lights in a uniform projecting order.

According to an exemplary embodiment, the controller 1240 may obtain a phase image and a depth image by receiving information about a projecting order of projected lights from the projected light controller 1210, and by projecting a laser diode (LD) with light after controlling the LD by using the received information.

According to an exemplary embodiment, the controller 1240 may obtain a phase image and a depth image by receiving information about a projecting order of projected lights from the projected light controller 1210, and by modulating a shutter after controlling the shutter by using the received information.

Furthermore, the projected light controller 1210 may receive the obtained depth image as feedback and may use the depth image when determining a projecting order of projected lights.

According to an exemplary embodiment, the controller 1240 may obtain a phase image and a depth image by receiving information about a projecting order of projected lights from an external input, and by projecting an LD with light after controlling the LD by using the received information.

According to an exemplary embodiment, the controller 1240 may obtain a phase image and a depth image by receiving information about a projecting order of projected lights from an external input, and by modulating a shutter after controlling the shutter by using the received information.

FIG. 13 is a schematic view illustrating an exemplary structure of a device 100 acquiring distance information by being controlled by projected lights, according to an exemplary embodiment.

Referring to FIG. 13, the controller 1240 may include a controller 106, a projected light controller 1210, a light source driver 102, a light modulator driver 104, and a distance-information image processor 107, according to an exemplary embodiment. Furthermore, according to an exemplary embodiment, the modulator 1230 may include a first lens 108, a filter 109, a light modulator 103, a second lens 110, and an imaging device 105.

An operation of each component of FIG. 13 may be understood by referring descriptions of FIGS. 1 and 12.

Figure 14:
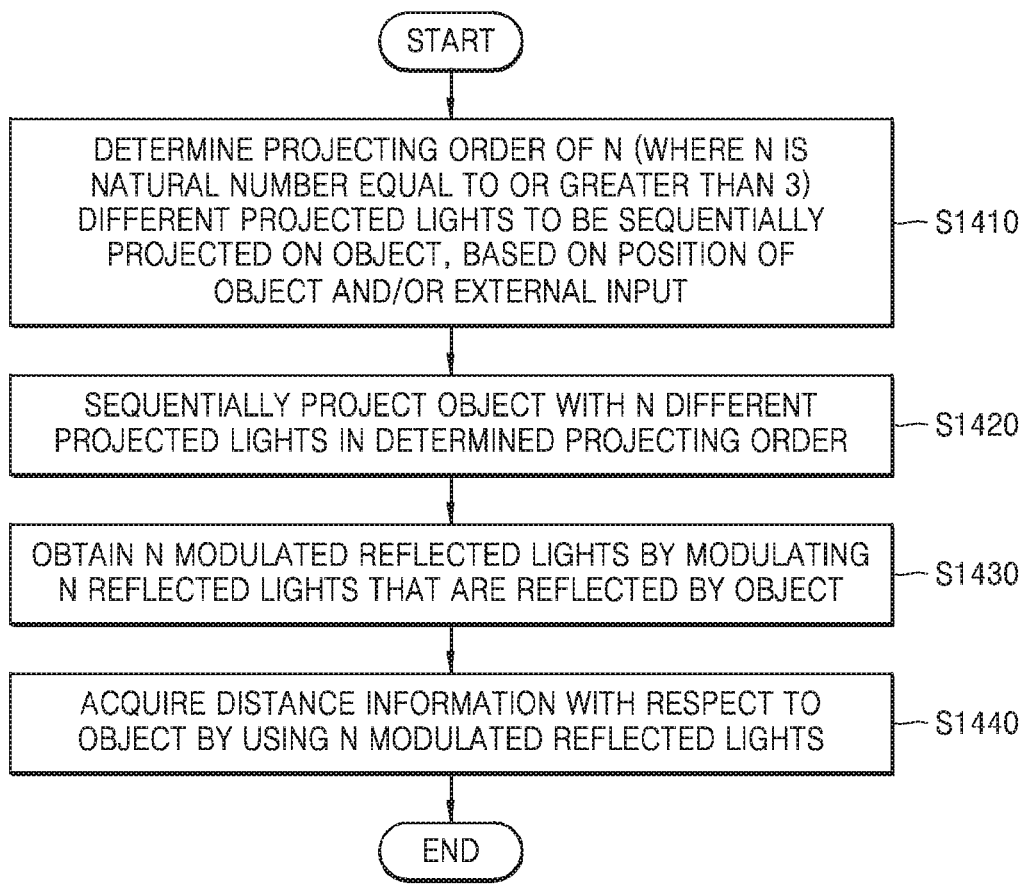
FIG. 14 is a flowchart for describing a method of acquiring distance information by using N projected lights, the method being performed by a device, according to an exemplary embodiment.

FIG. 14 is a flowchart for describing a method of acquiring distance information by using N projected lights, the method being performed by a device 100, according to an exemplary embodiment.

In operation S1410, the device 100 may determine a projecting order of N (where N is a natural number equal to or greater than 3) different projected lights to be sequentially projected onto an object, based on a position of the object and/or an external input, according to an exemplary embodiment.

The N different projected lights may include periodic waves having an identical period and at least one of different sizes and different phases.

According to an exemplary embodiment, the device 100 may sequentially project an object with four projected lights having respective phases. For example, the first to fourth projected lights may have the same period, waveform, and size and different phases. For example, a phase of the first projected light may be delayed by 90° from that of the second projected light, a phase of the second projected light may be delayed by 90° from that of the third projected light, and a phase of the third projected light may be delayed by 90° from that of the fourth projected light. Alternatively, a phase of the first projected light may precede by 90° than that of the second projected light, a phase of the second projected light may precede by 90° than that of the third projected light, and a phase of the third projected light may precede by 90° than that of the fourth projected light.

According to an exemplary embodiment, the device 100 may obtain a depth image by using three sub frame images, three CIS images or three CCD images, and furthermore, by using a phase difference of a light wave according to a TOF method, a reflection degree of an object surface, and ambient light.

According to an exemplary embodiment, the device 100 may obtain a depth image with reduced motion blur by using four sub frame images, four CIS images or four CCD images. When the device 100 obtains the depth image by using the four CIS images, the four CIS images may be obtained by four projected lights having phase differences different from each other, respectively. For example, the first to fourth projected lights may have the same period, waveform, and size and different phases by 90°.

According to an exemplary embodiment, the device 100 may determine a projecting order of N (where N is a natural number equal to or greater than 3) different projected lights to be sequentially projected onto an object, based on a position of the object. For example, the device 100 may determine a projecting order of projected lights according to a distance between an object and the device 100 and may project the object with the projected lights.

According to an exemplary embodiment, the device 100 may determine a projecting order corresponding to a distance between the device 100 and an object from among a plurality of preset projecting orders of projected lights as a projecting order of projected lights to be sequentially projected onto the object by the device 100. For example, when N is four, 24 projecting orders may correspond to preset distances, respectively, and the device 100 may determine a projecting order corresponding to a distance between the device 100 and an object from among the 24 projecting orders as a projecting order of projected lights to be sequentially projected onto the object from the light source 100. For example, the device 100 may determine the first projecting order as a projecting order of projected lights when the distance between the device 100 and the object is less than 1 m, the second projecting order as a projecting order of projected lights when the distance between the device 100 and the object is 2 m to 3 m, and the third projecting order as a projecting order of projected lights when the distance between the device 100 and the object is 3 m to 4 m, etc.

According to an exemplary embodiment, the device 100 may determine a projecting order to minimize motion blur of an object from among the preset projecting orders as a projecting order of projected lights. For example, the device 100 may determine a projecting order to minimize motion blur of an object from among the preset projecting orders as a projecting order of projected lights, based on a position of the object and/or an external input.

Returning to FIG. 14, in operation S1420, the device 100 may sequentially project an object with N different projected lights in the determined projecting order that is determined in operation S1410, according to an exemplary embodiment.

For example, the device 100 may sequentially project an object with the first projected light 610, the second projected light 620, the third projected light 630, and the fourth projected light 640 in the determined projecting order that is determined by operation S1410.

For example, the device 100 may sequentially project an object with the first projected light 610, the fourth projected light 640, the third projected light 630, and the second projected light 620 in the determined projecting order that is determined by operation S1410.

For example, the device 100 may sequentially project an object with the third projected light 630, the second projected light 620, the first projected light 610, and the fourth projected light 640 in the determined projecting order that is determined by operation S1410.

For example, the device 100 may sequentially project an object with the second projected light 620, the third projected light 630, the fourth projected light 640, and the first projected light 610 in the determined projecting order that is determined by operation S1410.

For example, the device 100 may sequentially project an object with the third projected light 630, the fourth projected light 640, the first projected light 610, and the second projected light 620 in the determined projecting order that is determined by operation S1410.

For example, the device 100 may sequentially project an object with the fourth projected light 640, the first projected light 610, the second projected light 620, and the third projected light 630 in the determined projecting order that is determined by operation S1410.

The determined projecting order in operation S1420 is an example, and is not limited to the above-described examples.

In operation S1430, the device 100 may obtain N modulated reflected lights by modulating N reflected lights that are reflected by an object, according to an exemplary embodiment.

According to an exemplary embodiment, the device 100 may obtain reflected lights, which are N different projected lights projected in operation S1420 and reflected by an object. According to an exemplary embodiment, the device 100 may modulate the obtained reflected lights and may obtain N modulated reflected lights.

According to an exemplary embodiment, the device 100 may modulate N reflected lights based on a light modulation signal having a gain waveform and may obtain N modulated reflected lights. The light modulation signal may include periodic waves having same period as the projected lights.

A specific method of modulating and obtaining the reflected lights is described above with reference to FIGS. 1 through 3 in detail.

In operation S1440, the device 100 may acquire information about a distance between the device 100 and the object based on the N modulated reflected lights obtained in operation S1430, according to an exemplary embodiment.

For example, the device 100 may obtain a three-dimensional image or a depth image with respect to an object based on the N modulated reflected lights obtained in operation S1430.

A specific method of obtaining a three-dimensional image or a depth image with respect to an object by using modulated reflected lights was described in FIGS. 1 through 3 in detail.

Motion blur may occur when an object changes over time such as when the object moves, when intensity of ambient light irradiating the object changes, and when a reflection degree of an object surface changes over time.

According to an exemplary embodiment, the device 100, when projecting a plurality of projected lights in the determined projecting order that is determined in operation S1430, may obtain a depth image having less motion blur than when projecting a plurality of projected lights in a uniform projecting order.

Furthermore, as described above in FIGS. 4 through 11, the device 100 may determine a projecting order for reducing motion blur from among a plurality of projecting orders, according to an exemplary embodiment. According to an exemplary embodiment, the device 100 may obtain a depth image by projecting projected lights in the determined projecting order, by obtaining reflected lights, which are obtained by reflecting the projected lights, and by modulating the obtained reflected lights. Here, according to an exemplary embodiment, the device 100 may obtain a depth image having less motion blur than when projecting a plurality of projected lights in a uniform projecting order.

Figure 15:
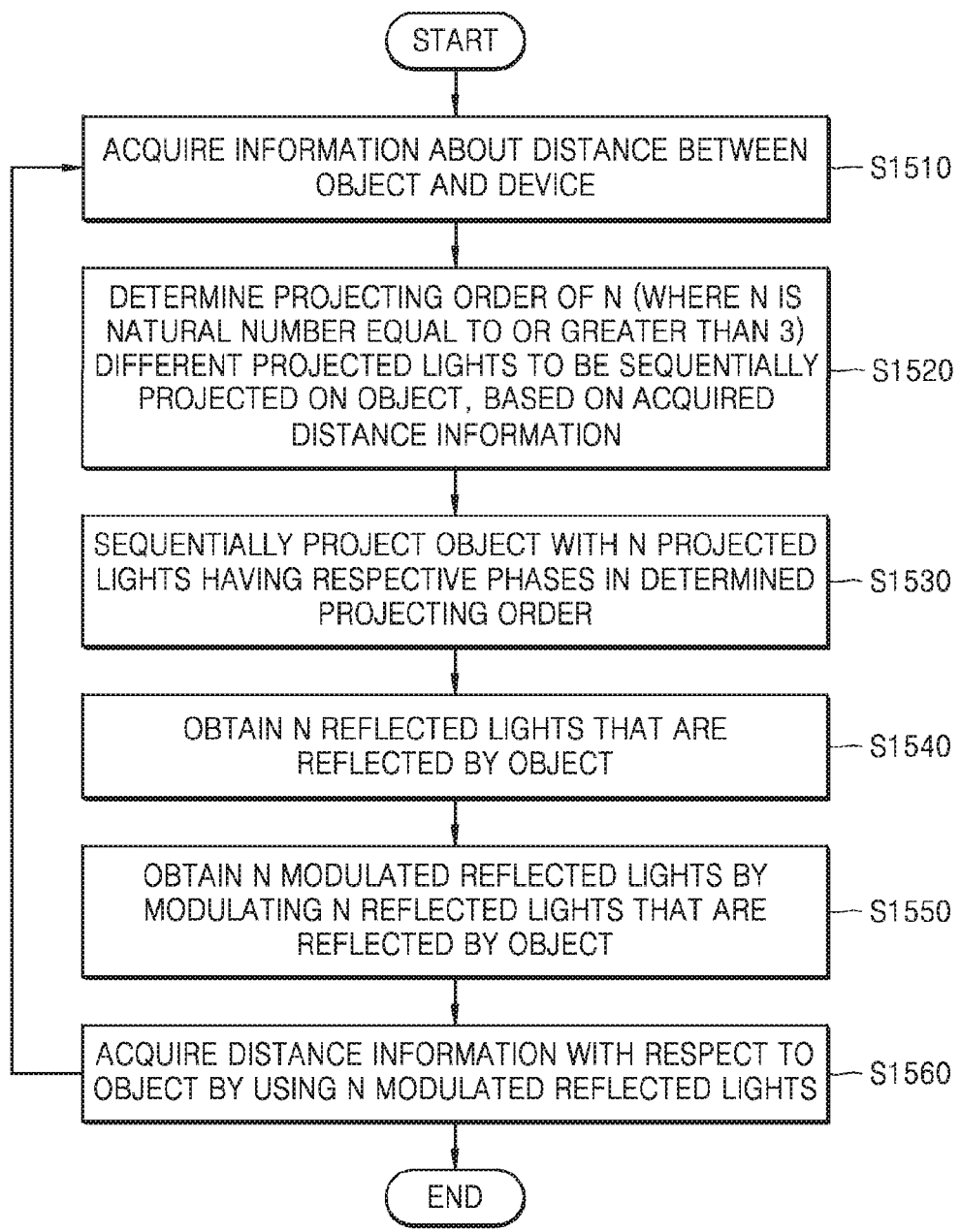
FIG. 15 is a flowchart for describing a method of acquiring distance information by using N projected lights having respective phases, the method being performed by a device, according to an exemplary embodiment.

FIG. 15 is a flowchart for describing a method of acquiring distance information by using N projected lights having respective phases, the method being performed by a device 100, according to an exemplary embodiment.

In operation S1510, the device 100 may acquire information about a distance between an object and the device 100, according to an exemplary embodiment.

For example, the device 100 may obtain a distance between an object and the device 100 by using a three-dimensional image or a depth image that is already obtained.

For example, the device 100 may acquire information about a distance between an object and the device 100 in real time, according to an exemplary embodiment. For example, the device 100 may obtain a distance between an object and the device 100 by receiving a depth image or a three-dimensional image, which is newly obtained in real time, and by using the received three-dimensional image or a depth image. For example, distance information to be acquired in operation S1560 may be information about a distance between an object and the device 100.

In operation S1520, the device 100 may determine a projecting order of N (where N is a natural number equal to or greater than 3) different projected lights to be sequentially projected onto an object, based on the acquired distance information, according to an exemplary embodiment.

According to an exemplary embodiment, the device 100 may acquire information about a distance between an object and the device 100, and may determine a projecting order of projected lights for minimizing motion blur of an object based on the acquired distance information.

According to an exemplary embodiment, the device 100 may determine a projecting order of projected lights corresponding the distance information acquired in operation S1510 as a projecting order of projected lights. For example, the device 100 may determine a projecting order of projected lights for minimizing motion blur of an object corresponding the distance information acquired in operation S1510 as a projecting order of projected lights. A projecting order capable of minimizing motion blur may be determined in advance or may be calculated, depending on a distance. FIG. 10 illustrates a specific example determining a projecting order of projected lights according to a distance between an object and the device 100.

In operation S1530, the device 100 may sequentially project an object with N projected lights having respective phases in the determined projecting order that is determined in operation S1520, according to an exemplary embodiment. A phase difference resulting from dividing 360° by N may exist between N projected lights having respective phases.

A specific method of sequentially projecting an object with N projected lights having respective phases in the determined projecting order that is determined in operation S1520 by the device 100 was described in detail in operation S1420, according to an embodiment.

In operation S1540, the device 100 may obtain N reflected lights that are reflected by an object, according to an exemplary embodiment.

According to an exemplary embodiment, the device 100 may obtain N reflected lights, which are projected lights projected in operation S1530 and reflected by an object. A reflection degree of the object may affect a determination of the reflected light. A specific method of obtaining the reflected lights was described in FIGS. 1 through 3 in detail.

As operations S1550 and S1560 correspond to operations S1430 and S1440, respectively, a detailed description thereof will not be given for simplicity of explanation.

Figure 16:
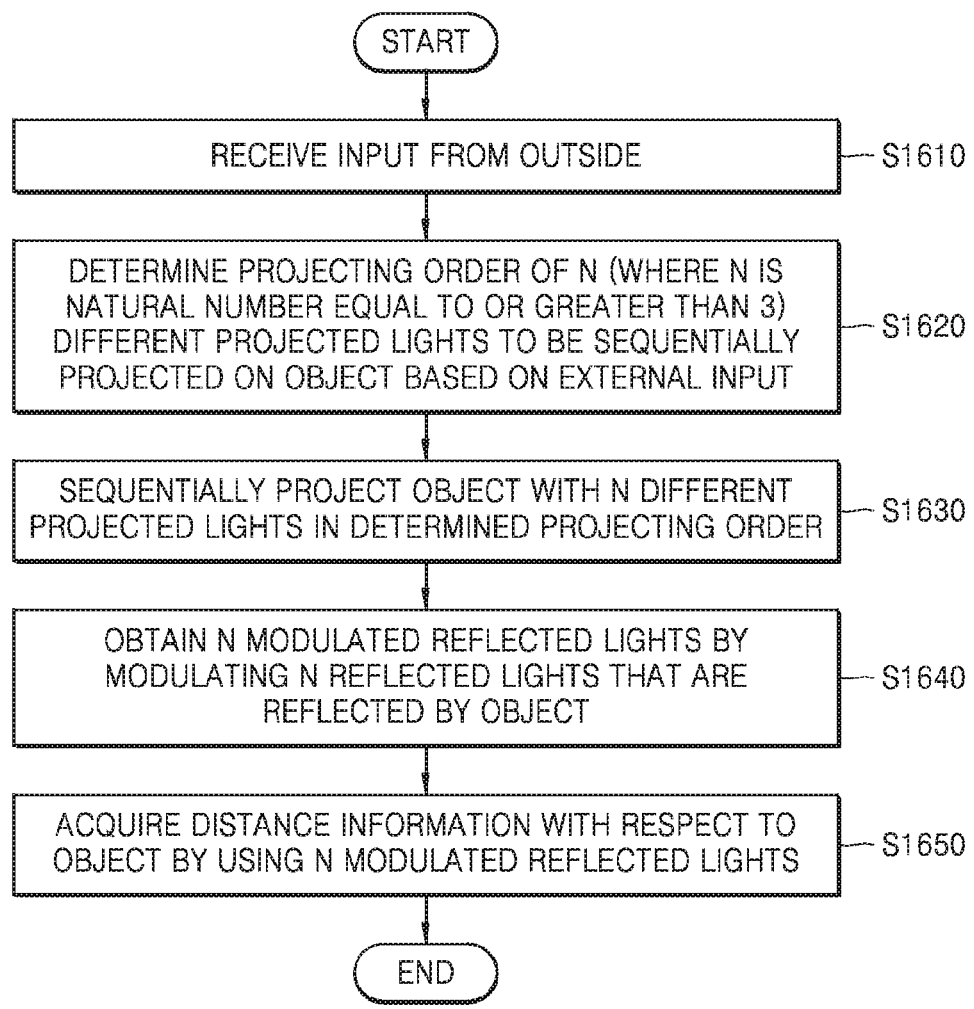
FIG. 16 is a flowchart for describing a method of acquiring distance information by projecting different projected lights in a determined projecting order that is determined based on an external input, the method being performed by a device, according to an exemplary embodiment.

FIG. 16 is a flowchart for describing a method of acquiring distance information by projecting different projected lights in a determined projecting order that is determined based on an external input, the method being performed by a device, according to an exemplary embodiment.

As operations S1630 to S1650 correspond to operations S1420 to S1440, respectively, a detailed description thereof will not be given for simplicity of explanation.

In operation S1610, the device 100 receives an input from outside.

According to an exemplary embodiment, the device 100 may receive a user input. For example, the device 100 may receive an external input that is determined based on the received user input, according to an exemplary embodiment. The user input may include at least one of a touch input, a keyboard input, a voice input, a sound input, a button input, a gesture input, and a multimodal input, but is not limited thereto.

According to an exemplary embodiment, the device 100 may receive an external input. For example, the device 100 may receive an external input by using a wireless or a wired system. For example, the device 100 may receive an external input from an external server or an external device of the device 100.

In operation S1620, the device 100 may determine a projecting order of N (where N is a natural number equal to or greater than 3) different projected lights to be sequentially projected onto an object based on an external input, according to an exemplary embodiment.

For example, the device 100 may determine a projecting order minimizing motion blur of an object from among the preset projecting orders as a projecting order of projected lights, based on an external input.

According to an exemplary embodiment, the device 100 may determine a projecting order corresponding to an external input from among a plurality of preset projecting orders of projected lights as a projecting order of projected lights to be sequentially projected onto an object by the device 100. For example, when N is four, the device 100 may determine a projecting order determined by an external input from among 24 projecting orders as a projecting order of projected lights to be sequentially projected onto an object by the device 100.

The above-described device and method for processing a signal according to a variety of exemplary embodiments may be recorded in a computer-readable recording medium and performed by a computer, so that the above-described functions may be performed.

Furthermore, corresponding code may further include a memory reference related code with respect to whether additional information required for performing the above-described functions by a computer processor or media should be referred to where (address) in an internal or external memory of a computer.

Examples of the computer-readable recording medium storing a program as described above include a ROM, a RAM, a CD-ROM, a magnetic tape, a floppy disk, an optical media storage, and so on.

A computer capable of reading a computer-readable recording medium, wherein an application, that is, a program performing a method of acquiring information according to each embodiment and a device thereof is recorded, may include a smart phone, a tablet personal-computer, personal digital assistants (PDA) and mobile terminals such as a mobile communication terminal. Furthermore, the computer may further include any computing device.

When a part "includes", "comprises", or "has" an element, unless there is a particular description contrary thereto, the part can further include other elements, not excluding the other elements.

According to exemplary embodiments of the disclosure, an error may be reduced efficiently by controlling projected lights, which are projected to an object, when a device acquires information about a distance between the device and the object.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of acquiring distance information, the method being performed by a device, the method comprising:
determining a projecting order of N (where N is a natural number equal to or greater than 3) different projected lights to be sequentially projected onto an object, based on a position of the object and/or an external input;
sequentially projecting the N different projected lights onto the object in the determined projecting order;
obtaining N modulated reflected lights by modulating N reflected lights reflected by the object; and
acquiring information about a distance between the device and the object based on the N modulated reflected lights.

2. The method of claim 1, wherein
the determining of the projecting order comprises acquiring initial distance information about a distance between the object and the device, and determining the projecting order based on the acquired initial distance information.

3. The method of claim 2, wherein
the acquiring of the initial distance information is performed in real time.

4. The method of claim 1, wherein
the determining of the projecting order comprises acquiring initial distance information about a distance between the object and the device, and determining the projecting order to minimize a motion blur of the object based on the acquired initial distance information.

5. The method of claim 1, wherein
the determining of the projecting order comprises determining the projecting order of projected lights to minimize motion blur of the object from among a plurality of preset projecting orders of projected lights as the projecting order of projected lights.

6. The method of claim 1, wherein
the N different projected lights comprise periodic waves having an identical period and at least one of different sizes and different phases.

7. The method of claim 1, wherein
the obtaining of the N modulated reflected lights comprises obtaining the N modulated reflected lights by modulating the N reflected lights based on a light modulation signal having a gain waveform.

8. The method of claim 7, wherein
the light modulation signal comprises periodic waves having a same period as the projected lights.

9. The method of claim 1, wherein
a phase difference resulting from dividing 360° by N exists between the N projected lights having respective phases.

10. The method of claim 1, wherein
the determining of the projecting order comprises determining the projecting order of projected lights based on an external input that is determined based on a user input.

11. A device for acquiring information about an object, the device comprising:
a projected light controller configured to determine a projecting order of N (where N is a natural number equal to or greater than 3) different projected lights to be sequentially projected onto an object, based on a position of the object and/or an external input;

a light source configured to sequentially project the object with the N different projected lights in the determined projecting order;

a modulator configured to obtain N modulated reflected lights by modulating N reflected lights reflected by the object; and a controller configured to acquire information about a distance between the device and the object based on the N modulated reflected lights.

12. The device of claim 11, wherein
the projected light controller is configured to acquire initial distance information about a distance between the object and the device, and to determine the projecting order of projected lights based on the acquired initial distance information.

13. The device of claim 11, wherein
the projected light controller is configured to acquire the initial distance information in real time.

14. The device of claim 11, wherein
the projected light controller is configured to acquire initial distance information about the distance between the object and the device, and to determine the projecting order to minimize motion blur of the object based on the acquired initial distance information.

15. The device of claim 11, wherein
the projected light controller is configured to determine the projecting order to minimize motion blur of the object from among a plurality of preset projecting orders of projected lights as the projecting order of projected lights.

16. The device of claim 11, wherein
the N different projected lights comprise periodic waves having an identical period and at least one of different sizes and different phases.

17. The device of claim 11, wherein
the modulator is configured to obtain the N modulated reflected lights by modulating the N reflected lights based on a light modulation signal having a gain waveform.

18. The device of claim 17, wherein
the light modulation signal comprises periodic waves having a same period as the projected lights.

19. The device of claim 11, wherein
a phase difference resulting from dividing 360° by N exists between the N projected lights having respective phases.

20. A non-transitory computer-readable recording medium having recorded thereon a program for executing the method of claim 1.

21. A method of acquiring distance information, the method being performed by a device, the method comprising iteratively performing:
sequentially projecting N different projected lights onto an object in a projecting order;
obtaining N modulated reflected lights by modulating N reflected lights reflected by the object;
acquiring distance information about a distance between the device and the object based on the N modulated reflected lights;
changing the projecting order of the N different projected lights based on the acquired distance information; and
sequentially projecting the N different projected lights onto the object in the changed projecting order.

22. The method of claim 21, wherein an initial projecting order is set based on an external input.

* * * * *